US008358976B2

(12) United States Patent
Jung et al.

(10) Patent No.: US 8,358,976 B2
(45) Date of Patent: *Jan. 22, 2013

(54) WIRELESS DEVICE WITH AN AGGREGATE USER INTERFACE FOR CONTROLLING OTHER DEVICES

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 121 days.

This patent is subject to a terminal disclaimer.

(21) Appl. No.: 12/798,261

(22) Filed: Mar. 31, 2010

(65) Prior Publication Data

US 2010/0253507 A1    Oct. 7, 2010

Related U.S. Application Data

(63) Continuation-in-part of application No. 11/389,669, filed on Mar. 24, 2006, now Pat. No. 7,725,077.

(51) Int. Cl.
*H04B 7/00*    (2006.01)
*G08B 3/00*    (2006.01)

(52) U.S. Cl. .................................... 455/41.2

(58) Field of Classification Search ................. 455/41.2; 340/5.32, 825.69
See application file for complete search history.

(56) References Cited

U.S. PATENT DOCUMENTS

| | | | |
|---|---|---|---|
| 4,922,443 | A | 5/1990 | Coetsier et al. |
| 5,612,669 | A | 3/1997 | Allen et al. |
| 5,648,897 | A | 7/1997 | Johnson et al. |
| 5,654,688 | A | 8/1997 | Allen et al. |
| 5,663,704 | A | 9/1997 | Allen et al. |
| 5,729,191 | A | 3/1998 | Allen et al. |
| 5,805,672 | A | 9/1998 | Barkat et al. |
| 5,818,329 | A | 10/1998 | Allen |
| 5,898,400 | A | 4/1999 | Jones et al. |
| 5,940,007 | A | 8/1999 | Brinkmeyer et al. |
| 5,982,277 | A | 11/1999 | Flick |
| 6,083,104 | A | 7/2000 | Choi |
| 6,130,606 | A | 10/2000 | Flick |
| 6,182,006 | B1 | 1/2001 | Meek |
| 6,184,780 | B1 | 2/2001 | Allen et al. |
| 6,366,198 | B1 | 4/2002 | Allen et al. |
| 6,377,825 | B1 | 4/2002 | Kennedy et al. |
| 6,480,098 | B2 | 11/2002 | Flick |
| 6,526,335 | B1 | 2/2003 | Treyz et al. |
| 6,556,899 | B1 | 4/2003 | Harvey et al. |
| 6,611,739 | B1 | 8/2003 | Harvey et al. |
| 6,628,233 | B2 | 9/2003 | Knockeart et al. |
| 6,639,550 | B2 | 10/2003 | Knockeart et al. |
| 6,647,328 | B2 | 11/2003 | Walker |
| 6,664,924 | B2 | 12/2003 | Knockeart et al. |
| 6,680,694 | B1 | 1/2004 | Knockeart et al. |
| 6,681,174 | B1 | 1/2004 | Harvey et al. |

(Continued)

OTHER PUBLICATIONS

U.S. Appl. No. 11/528,480, Jung, et al.

(Continued)

*Primary Examiner* — William D Cumming
(74) *Attorney, Agent, or Firm* — Suiter Swantz pc llo

(57) ABSTRACT

An apparatus, device, methods, computer program product, and system make a determination that a wireless device is in proximity to at least one secondary wireless device, and determine an aggregate user interface on the wireless device based on the determination.

28 Claims, 36 Drawing Sheets

U.S. PATENT DOCUMENTS

| | | |
|---|---|---|
| 6,707,421 B1 | 3/2004 | Drury et al. |
| 6,711,474 B1 | 3/2004 | Treyz et al. |
| 6,784,832 B2 | 8/2004 | Knockeart et al. |
| 6,812,888 B2 | 11/2004 | Drury et al. |
| 6,909,398 B2 | 6/2005 | Knockeart et al. |
| 6,919,792 B1 | 7/2005 | Battini et al. |
| 6,968,272 B2 | 11/2005 | Knockeart et al. |
| 6,970,783 B2 | 11/2005 | Knockeart et al. |
| 6,980,092 B2 | 12/2005 | Turnbull et al. |
| 7,023,379 B2 | 4/2006 | Turnbull |
| 7,036,076 B2 | 4/2006 | Anwar |
| 7,068,163 B2 | 6/2006 | Sari et al. |
| 7,103,556 B2 | 9/2006 | Del Rey et al. |
| 7,107,081 B1 | 9/2006 | Fujisaki |
| 7,135,962 B2 | 11/2006 | Durbin et al. |
| 7,142,096 B2 | 11/2006 | Eisenman |
| 7,155,674 B2 | 12/2006 | Breen et al. |
| 7,158,006 B2 | 1/2007 | Lee et al. |
| 7,200,801 B2 | 4/2007 | Agassi et al. |
| 7,224,262 B2 | 5/2007 | Simon et al. |
| 7,231,496 B2 | 6/2007 | Curtis |
| 7,240,067 B2 | 7/2007 | Timmons |
| 7,245,258 B2 | 7/2007 | Velhal et al. |
| 7,259,357 B2 | 8/2007 | Walker |
| 7,293,034 B2 | 11/2007 | Paya et al. |
| 7,327,226 B2 | 2/2008 | Turnbull et al. |
| 7,332,998 B2 | 2/2008 | Beehler et al. |
| 7,548,697 B2 | 6/2009 | Hudson et al. |
| 7,643,913 B2 | 1/2010 | Taki et al. |
| 7,725,077 B2 * | 5/2010 | Jung et al. ............ 455/41.2 |
| 2001/0050611 A1 | 12/2001 | Achterholt et al. |
| 2001/0052858 A1 | 12/2001 | Vincent et al. |
| 2002/0032510 A1 | 3/2002 | Turnbull et al. |
| 2002/0084893 A1 | 7/2002 | Eisenman |
| 2002/0130765 A1 | 9/2002 | Flick |
| 2002/0137505 A1 | 9/2002 | Eiche et al. |
| 2003/0018428 A1 | 1/2003 | Knockeart et al. |
| 2003/0055542 A1 | 3/2003 | Knockeart et al. |
| 2003/0055553 A1 | 3/2003 | Knockeart et al. |
| 2003/0055555 A1 | 3/2003 | Knockeart et al. |
| 2003/0067541 A1 | 4/2003 | Joao |
| 2003/0193404 A1 | 10/2003 | Joao |
| 2003/0206102 A1 | 11/2003 | Joao |
| 2004/0049324 A1 | 3/2004 | Walker |
| 2004/0049336 A1 | 3/2004 | Knockeart et al. |
| 2004/0049337 A1 | 3/2004 | Knockeart et al. |
| 2004/0056797 A1 | 3/2004 | Knockeart et al. |
| 2004/0064245 A1 | 4/2004 | Knockeart et al. |
| 2004/0066330 A1 | 4/2004 | Knockeart et al. |
| 2004/0104842 A1 | 6/2004 | Drury et al. |
| 2004/0107144 A1 | 6/2004 | Short |
| 2004/0179545 A1 | 9/2004 | Erola et al. |
| 2004/0183676 A1 | 9/2004 | Eisenman |
| 2004/0196179 A1 | 10/2004 | Turnbull |
| 2005/0064814 A1 | 3/2005 | Matsuo et al. |
| 2005/0073388 A1 | 4/2005 | Lee et al. |
| 2005/0088280 A1 | 4/2005 | Beehler et al. |
| 2005/0168071 A1 | 8/2005 | Durbin et al. |
| 2005/0203752 A1 | 9/2005 | Shinada |
| 2006/0061458 A1 | 3/2006 | Simon et al. |
| 2006/0097855 A1 | 5/2006 | Turnbull et al. |
| 2006/0214813 A1 | 9/2006 | Witkowski et al. |
| 2006/0226949 A1 | 10/2006 | Reene |
| 2006/0232377 A1 | 10/2006 | Witkowski |
| 2006/0261931 A1 | 11/2006 | Cheng |
| 2007/0008189 A1 | 1/2007 | Amari et al. |
| 2007/0027595 A1 | 2/2007 | Nou |
| 2007/0032225 A1 | 2/2007 | Konicek et al. |
| 2007/0152798 A1 | 7/2007 | Witkowski |
| 2007/0176736 A1 | 8/2007 | Chuey et al. |
| 2007/0197172 A1 | 8/2007 | Witkowski et al. |
| 2007/0224937 A1 | 9/2007 | Jung et al. |
| 2007/0224938 A1 | 9/2007 | Jung et al. |
| 2008/0027590 A1 | 1/2008 | Phillips et al. |
| 2008/0063400 A1 | 3/2008 | Hudson et al. |
| 2008/0065274 A1 | 3/2008 | Taki et al. |
| 2008/0068205 A1 | 3/2008 | Witkowski |
| 2008/0086241 A1 | 4/2008 | Phillips et al. |
| 2008/0091309 A1 | 4/2008 | Walker |
| 2008/0103640 A1 | 5/2008 | Watanabe et al. |
| 2008/0103655 A1 | 5/2008 | Turnbull et al. |
| 2008/0129449 A1 | 6/2008 | Beehler et al. |
| 2008/0143686 A1 | 6/2008 | Yeh et al. |
| 2008/0164972 A1 | 7/2008 | Taki et al. |
| 2008/0183376 A1 | 7/2008 | Knockeart et al. |
| 2008/0266254 A1 | 10/2008 | Robbins et al. |
| 2008/0309451 A1 | 12/2008 | Zellweger et al. |
| 2009/0037033 A1 | 2/2009 | Phillips et al. |

OTHER PUBLICATIONS

U.S. Appl. No. 11/444,973, Jung, et al.

U.S. Appl. No. 11/414,161, Jung, et al.

Oswald, ED; "blinkx Looks to Make Search Automatic"; BetaNews; Bearing dates of Mar. 7, 2006 and 1998-2006; pp. 1-6; BetaNews, Inc.; located at: http://www.betanews.com/article/blinkx_Looks_to_Make_Search_Automatic/1141754474; printed on Mar. 22, 2006.

"Welcome"; NFC-Forum; bearing a date of 2005; pp. 1-2; printed on May 31, 2006; located at: http://www.nfc-forum.org/home; NFC Forum.

"Applications: eCash on the Move at Volkswagen"; iButton Applications/Dallas Semiconductor MAXIM, Bearing a date of 2006; located at: http://www.maxim-ic.com/products/ibutton/applications/index.cfm?Action=DD&id=21; Maxim Integrated Products.

"Applications: "Mass Transit in Istanbul, Turkey" and "Parking in Argentina""; iButton Application/Dallas Semiconductor MAXIM; Bearing a date of 2006; pp. 1-3; printed Feb. 27, 2006; located at: http://www.maxim-ic.com/products/ibutton/applications/index.cfm?Action=DD&id=8; Maxim Integrated Products.

"Cellport Announces First Universal, Hands-Free Cell Phone System for Cars"; Intelligent Transportation Society of America; Bearing a date of Jul. 16, 2001; pp. 1-2; printed on Feb. 24, 2006; located at: http://www.itsa.org/itsnews.nsf/key/5FAA?OpenDocument; Intelligent Transportation Society of America.

"City of Caen, France, to demonstrate simplicity of Near Field Communication (NFC) technology"; bearing a date of Oct. 18, 2005; pp. 1-3; printed on Mar. 20, 2006; located at: http://www.semiconductors.philips.com/news/content/file_1193.html; Koninklijke Philips Electronics N.V.

"Ecma welcomes ISO/IEC adoption of NFC Standard for short range wireless communication"; ecma International; Bearing a date of Dec. 8, 2003; printed Feb. 24, 2006; pp. 1-3; located at: http://www.ecma-international.org/news/Ecma-340-NFCIP-1.htm.

Kiser, Ken; "Newall Electronics Introduces Wearable DRO Technology"; Industrial Product News Online; pp. 1-2; printed Feb. 24, 2006; located at: http://www.ipnews.com/archives/dro/jan02/newall%5Felect.htm.

Lewis, John; "Put on your uman-machine interface"; Design News; Bearing dates of Aug. 20, 2001 and 1997-2006; pp. 1-4; printed Feb. 24, 2006; located at: http://designnews.com/article/CA150040.html; Red Business Information.

"Near Field Communication"; What You Need to Know About; Bearing a date of 2006; pp. 1-3; printed on Mar. 3, 2006; located at: http://experts.about.com/e/n/ne/Near_Field_Communication.htm; About, Inc.

"Near Field Communication"; Wikipedia; Bearing a date of Feb. 17, 2006; pp. 1-2; printed on Feb. 24, 2006; located at: http://en.wikipedia.org/wiki/Near_Field_Communication.

"Near field communication set for full-scale trial"; pp. 1-3; bearing a date of Oct. 20, 2005; printed on Mar. 20, 2006; located at: http://www.electronicstalk.com/news/phi/phi328.html; Pro-Talk Ltd, UK.

"Philips, Samsung and Telefonica Moviles Espana Demonstrate Simplicity of Near Field Communication Technology at 3GSM World Congress; 200 Attendees Can Enjoy Easy Payment and Convenient Access at Fira de Barcelona Convention Center"; PHILIPS; bearing a date of Feb. 7, 2006; pp. 1-4; printed on Mar. 20, 2006; located at: http://home.businesswire.com/portal/site/google/index.jsp?ndmViewId=news_view&newsId=20060207005492&newsLang=en; Business Wire.

"Secure Website Logon and Transactions"; iButton Applications; Bearing a date of 2004; pp. 1-2; printed on Mar. 3, 2006; located at:

http://72.14.207.104/search?q=cache:4JM396tN__ToJ:db.maxim-ic.com/ibutton/applications/index.cfm; Maxim/Dallas Semiconductor Corp.

Swedberg, Claire; "Developing RFID-Enabled Phones"; RFID Journal; bearing dates of Jul. 9, 2004 and 2002-2006; pp. 1-3; printed on Mar. 20, 2006; located at: http://www.rfidjournal.com/article/articleview/1020/1/1/; RFID Journal, LLC.

Thomson, Iain; "Industry giants tout touch computing"; Computing; Bearing dates of Mar. 19, 2004 and 1995-2006; pp. 1-2; printed Feb. 24, 2006; located at: http://www.vnunet.com/vnunet/news/2124597/industry-giants-tout-touch-computing; vnu business publications.

U.S. Appl. No. 12/798,261, Edward K.Y. Jung.

* cited by examiner

WIRELESS DEVICE WITH AN AGGREGATE USER INTERFACE FOR CONTROLLING OTHER DEVICES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 11/389,669, entitled Wireless Device With an Aggregate User Interface for Controlling Other Devices naming Edward K.Y. Jung, Royce A. Levien, Robert W. Lord, Mark A. Malamud, John D. Rinaldo, Jr., and Lowell L. Wood, Jr. as inventors, filed Mar. 24, 2006, now U.S. Pat. No. 7,725,077, which is currently an application of which a application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

An embodiment provides a method. In one implementation, the method includes but is not limited to making a determination that a wireless device is in proximity to at least one secondary wireless device and determining an aggregate user interface on the wireless device based on the determination. In addition to the foregoing, other method aspects are described in the claims, drawings, and text forming a part of the present disclosure.

An embodiment provides a computer program product. In one implementation, the computer program product includes but is not limited to a signal-bearing medium bearing at least one of one or more instructions for making a determination that a wireless device is in proximity to at least one secondary wireless device, and the signal bearing medium bearing at least one of one or more instructions for determining an aggregate user interface on the wireless device based on the determination. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device cause the computing device to make a determination that a wireless device is in proximity to at least one secondary wireless device and determine an aggregate user interface on the wireless device based on the determination. In addition to the foregoing, other system aspects are described in the claims, drawings, and text forming a part of the present disclosure.

An embodiment provides a device. In one implementation, the device includes but is not limited to a wireless device configured to determine when it is in proximity to at least one secondary wireless device, and the wireless device includes an aggregate user interface configured to be determined on the wireless device. In addition to the foregoing, other device aspects are described in the claims, drawings, and text forming a part of the present disclosure.

BRIEF DESCRIPTION OF THE DRAWINGS

The use of the same symbols in different drawings typically indicates similar or identical items.

DETAILED DESCRIPTION

Figure 1:
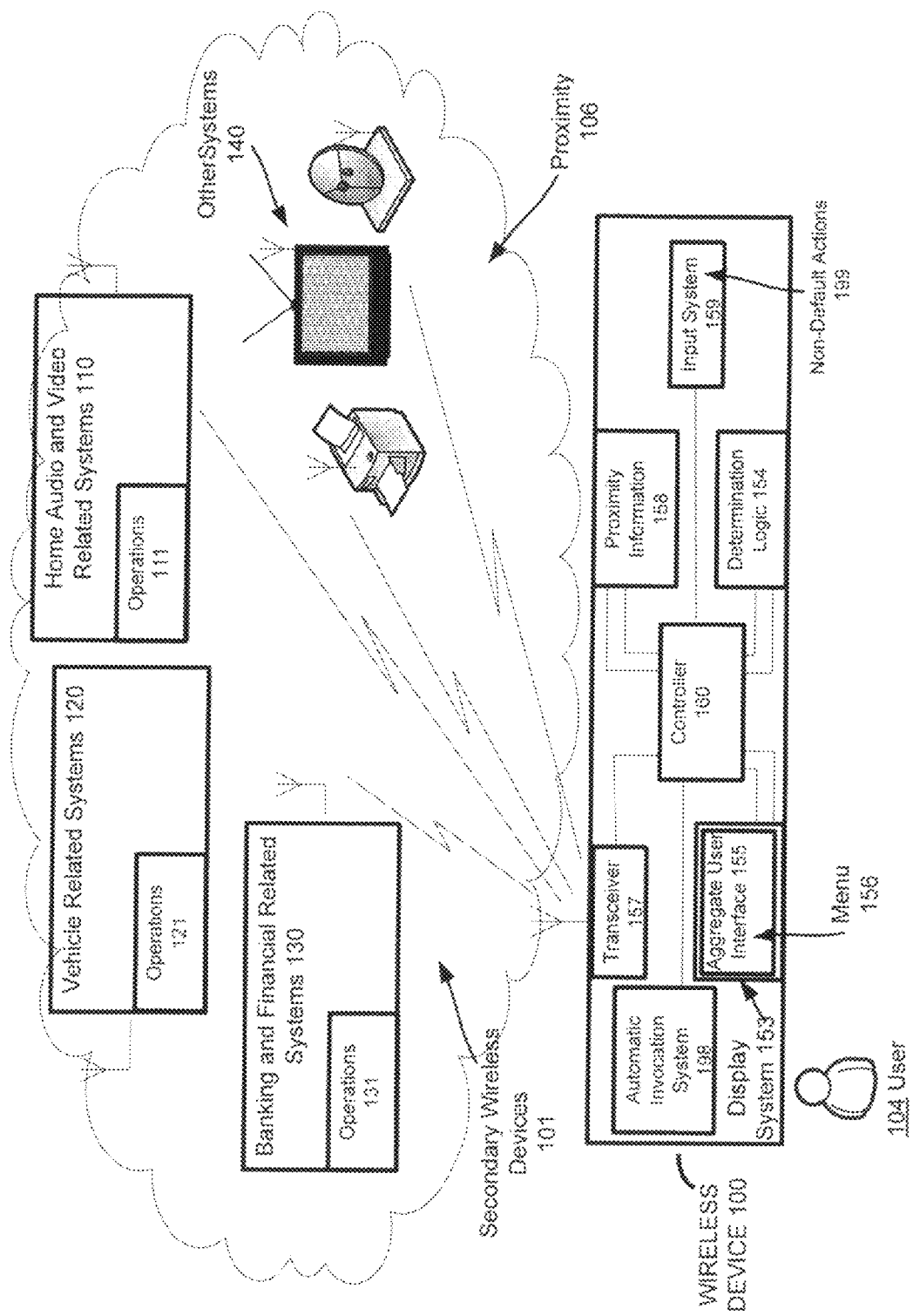
FIG. 1 illustrates an example wireless device with an aggregate user interface in which embodiments may be implemented, perhaps in a device.

FIG. 1 illustrates an example wireless device 100 in which embodiments may be implemented. A wireless device 100 may include a display system 153 for displaying a variety of information, such as an aggregate user interface 155, which may include a menu 156. Wireless device 100 may also include a controller 160 for providing overall control of wireless device 100, a (wireless) transceiver 157 to transmit (send) and receive signals, determination logic 154 for making various determinations, and automatic invocation system 198 for automatically invoking operations with minimal or, in some cases, no user interaction, for example. Controller 160 may be, for example, a programmed controller or microprocessor, and may include hardware, software, and/or a combination of hardware and software, for example. Controller 160 may include, for example, a processor, memory, input and output, and other hardware, software, and/or firmware generally associated with a general purpose computing device. An input system 159 may include a keyboard, keypad, pointing device (e.g., mouse, pointing stick), biometric identifier, button, toggle switch, or other input device that, for example, may be used by a user to input information to wireless device 100. Input System 159 may include non-default actions 199 which may be, for example, button or key presses, or the like that may be used to indicate that a non-default action should be invoked.

Wireless device 100 may also include or store proximity information 158 relating to one or more secondary wireless devices 101. Proximity information 158 may provide, for example, information relating to a location or closeness or proximity of one or more secondary wireless devices to the wireless device 100. For example, proximity information 158 may identify a location of each secondary wireless device, identify a distance (e.g., from device 100) to a secondary wireless device, or may provide a list of which devices are in proximity (e.g., near or within a predetermined distance) to wireless device 100, and/or may identify which secondary wireless device(s) are closest to wireless device 100, identify a secondary wireless device that has been touched by wireless device 100, etc.

Wireless device 100 may be in proximity to or near one or more secondary wireless devices 101. Secondary wireless devices 101 may include, for example, home audio and video related systems 110, vehicle related systems 120, banking and financial related systems 130, and other systems 140. Other systems 140 may include a variety of other example wireless devices, such as a printer, television, and satellite receiver, shown here, as well as other devices such as a camera, personal computer, photo frame, personal digital assistant (PDA), or any number of secondary wireless devices that may establish a wireless network connection or link with another device. Each of the secondary wireless devices 101 may include a controller, a wireless transceiver, automatic invocation systems, determination or other logic, etc., as shown for wireless device 100. Each of the secondary wireless devices 101 may include one or more operations 111, 121, and 131, which may be performed on or with respect to such secondary wireless devices 101, and such operations are not shown with respect to other systems 140, but they are included in those systems as well.

Secondary wireless devices 101 shown in FIG. 1 provide several example types of devices but it is not an exhaustive list, and may also include any device or part of a device with a wireless capability (e.g., including a vehicle or car itself, or a part of the vehicle, for example). Similarly, secondary wireless devices, which may be used to determine an aggregate user interface 155 on the wireless device 100 (and is in turn being operated by it) may not itself be "wireless" or "wireless capable", but may work though an intermediary device (not shown) in order to communicate wirelessly with wireless device 100.

The wireless device 100 may be controlled by a user 104, for instance, to control one or more secondary wireless devices 101, which are in proximity 106 to wireless device 100 or nearby wireless device 100. According to an example embodiment, proximity 106 may refer to an area that is near or in proximity to wireless device 100. Thus, the various secondary wireless devices 101 may be in proximity or near wireless device 100.

In operation, the wireless device 100 may be used, for example, to control one or more secondary wireless devices 101 using a variety of different techniques. When a secondary wireless device is within proximity 106 or near wireless device 100, wireless device 100 may establish a wireless link or wireless network connection with the secondary wireless device, e.g., via (wireless) transceiver 157. For example, by establishing a wireless link and communicating information with a secondary wireless device, wireless device 100 may determine or make a determination that the secondary wireless device is in proximity to wireless device 100. Alternatively, wireless device 100 may determine that a secondary wireless device is in proximity to wireless device 100 based on a touching or contact between the device 100 and the secondary wireless device 101 (e.g., wireless device 100 touches a "hot spot" or designated area of the secondary wireless device). Similarly, a secondary wireless device 101 may determine that it is in proximity or near to wireless device 100, e.g., either through a wireless communication link that is established with or contact to wireless device 100, for example.

According to an example embodiment, one of secondary wireless devices 101 and the wireless device 100 may establish a wireless connection or wireless link and may exchange data when the two devices are near each other or within a maximum distance, e.g., when the secondary wireless device is within proximity 106 or near wireless device 100. For example, when a user carrying wireless device 100 (or other device) moves toward the area generally indicated as proximity 106 in FIG. 1, he begins to make closure with (or move nearer to) the proximity 106. At this point the wireless device 100, the secondary wireless devices 101, or a combination of both may make a determination that the wireless device 100 is in proximity to one or more of the secondary wireless devices 101.

Once a secondary wireless device 101 is in proximity (e.g., near or touching) wireless device 100, a wireless connection or link may be established, for instance using transceiver 157 and similar transceivers on the secondary wireless devices. A variety of information may then be exchanged between the devices, and one or more actions or operations may be performed on the wireless device 100, e.g., either as default actions (via automatic invocation system 198), or as non-default actions 199 upon a user selection, for instance.

According to an example embodiment, wireless device 100 may determine an aggregate user interface 155, e.g., based on a determination that one or more secondary wireless devices 101 are in proximity or near wireless device 100 or based on a determination that one or more of the secondary wireless devices 101 have operations that are of particular use to the user 104, or both, as examples. In an example embodiment, the aggregate user interface 155 may be provided or displayed on display system 153 of wireless device 100, for example.

The aggregate user interface 155 may, for example, be a user interface that may provide an aggregate or cumulative interface providing one or more information elements related to one or more devices. For example, the aggregate user interface may include a list of operations associated with one or more devices that may be in proximity to device 100, or a menu 156 of elements or operations for each of a plurality of wireless devices in proximity. The aggregate user interface 155 may change or be updated based on changing environment, e.g., a new set of operations displayed as new wireless devices come into proximity, etc. The aggregate user interface 155 may be continually updated by sorting a list of secondary wireless devices 101 in proximity 106, e.g., ordered by distance and changing the output to display system 153. This updating of the aggregate user interface 155 may be performed, for example, in part using determination logic 154 and controller 160, along with proximity information 158 associated with each secondary wireless device. However, aggregate user interface 155 may also be centrally determined, or determined by an "observer" component (not shown) removed from the wireless device 100, or alternatively on one or more of the secondary wireless devices 101.

A number of examples will now be provided, and these are only illustrative and the embodiments are not limited thereto. In one example, the user 104 may carry wireless device 100 and move toward a camera in the area generally indicated as proximity 106 (being in proximity to various secondary wireless devices 101), the camera having a particular photo or image displayed thereon. In an example, if the user 104 is holding a wireless device 100 comprising a cellular phone with a particular contact selected, automatic invocation system 198 of the camera may send or wirelessly transmit the photo to the cellular phone, where the photo may be stored with or associated with the contact on the cellular phone. For example, this may be done automatically, e.g., without direct interaction from the user 104 other than to move toward one of the secondary wireless devices 101 in the above-described state.

In another example, the user 104 with a PDA type wireless device 100 may move toward a printer in other systems 140, in the area generally indicated as proximity 106 (thus, the two devices are in proximity). The printer may detect the PDA wireless device and determine that the devices are in proximity (e.g., wireless detection or contact) and may print a document displayed on the PDA. Alternatively, or in addition, a user 104 may use the input system 159 to provide additional input, e.g., by tapping on input system 159, or selecting a key, or by reorienting the wireless device (e.g., PDA in this example) to present a print dialog on the PDA or select a specific action to be performed.

When an MP3 player style wireless device 100 is brought into proximity 106 with a PC in secondary wireless devices 101, a menu 156 may be presented on the MP3 player with options, for example, to sync, begin playing the current song on the PC, transfer the user interface of the MP3 player (in its current state) to the PC. After a brief pause (if none of these is explicitly selected) automatic invocation system 198 may cause the MP3 player to stop playing and have the PC take over playing the current song.

Tapping, gesturing, or reorienting a camera style wireless device 100 when it is in proximity 106 with to a digital photo frame in secondary wireless devices 101 may cause automatic invocation system 198 to put a suitably transformed, current viewfinder image to the photo frame. Double tapping, represented by non-default actions 199, may be used to put the entire contents of the camera, a slideshow, and/or a menu 156 of transition effects choices on the camera style wireless device 100.

Another example may occur when the user 104 is carrying wireless device 100 and moves toward the area generally indicated as proximity 106. Automatic invocation system 198 may cause the display system 153 to present a menu 156 of operations supported by one or more of the secondary wireless devices 101 that are in proximity 106. The menu 156 may be used to operate the secondary wireless devices 101. For example, each of the secondary wireless devices 101 are indicated as having operations 111, 121, and 131 that may be performed on them. The menu 156 may be a list of these operations and selecting one of them sends a command to the secondary wireless devices 101 and causes one of the secondary wireless devices 101 to otherwise execute the command.

Another example occurs when the user 104 is carrying wireless device 100 and moves toward the area generally indicated as proximity 106. The wireless device 100 automatically connects to a DVD in home audio and video related systems 110 and then to a CD player in home audio and video related systems 110 and then to a game system, such as an Xbox or Playstation, which may be used to determine and/or provide an aggregate user interface 155 presenting a collected user interface for all the devices in home audio and video related systems 110. The aggregate user interface 155 may then be used to operate all of the devices in home audio and video related systems 110. For example, a menu 156 may be provided with a "Play" operation 111 with a submenu "Play Music, Play DVD" each of which has submenus, (i.e., On Xbox, On CD player). This aggregate user interface 155 and/or menu 156 may also vanish or disappear from display system 153 after a fixed time unless the user 104 asks to keep it, for example.

Another example occurs when the user 104 is carrying wireless device 100 and moves toward the area generally indicated as proximity 106 and establishes a wireless link to or contacts vehicle related systems 120. Automatic invocation system 198 may be used to unlock the car by default, e.g., after device comes into proximity with the vehicle related system 120 (e.g., either through contact with vehicle related system 120 or by establishing a wireless link or communication with vehicle related system 120). Alternatively, pressing a button, for example, in non-default actions 199 may present a menu 156 with choices (unlock, adjust seats, unlock all, start engine, turn lights on, and open windows, for example) on device 100 with respect to the vehicle system 120 that is now in proximity 106 to wireless device 100. Walking away from the car in vehicle related systems 120 may cause the wireless device 100 to leave proximity 106 which can similarly invoke an action automatically via automatic invocation system 198, for example locking the car (or otherwise performing a default set of "leaving" actions that user 104 has set on wireless device 100). This set of leaving actions may occur, e.g., either in response to a user selection on input system 159, or may occur automatically when wireless device 100 determines that it is no longer in proximity 106 to the vehicle related systems 120 (e.g., device 100 no longer contacting vehicle related systems 120 or wireless detection that device 100 is no longer near or in proximity to vehicle related systems 120, such as detecting that a wireless link has been disconnected, or no longer associated with vehicle related systems 120).

The above system may be caused to couple with banking and financial related systems 130, for example in the case of a vehicle rental activity by a user. The wireless device 100 may be set by default to not only use vehicle related systems 120 to unlock the car and start the motor, for example, but it might also charge the user's credit card the fee required to rent the vehicle as well. Such user data needed to complete the transaction may be stored in the wireless device 100 or it may be known by secondary wireless devices 101 as well.

If the wireless device 100 is in proximity 106 to a TV in other systems 140, automatic invocation system 198 may be used to turn on to the show that user 104 has scheduled in his calendar for this time. If no default action is available (i.e., the user 104 has no calendar entry), the viewing history or preferences of the user 104 may be used to select a channel, if viewing history and/or preferences cannot be used, the system may turn on the TV as usual. Alternatively, if user 104 has a web browser application executing on the wireless device 100 and the web browser is pointed to the URL "http://www.cnn.com/, for example, the TV may be tuned to CNN as well.

In another example, the user 104 moves toward proximity 106 with a plurality of secondary wireless devices 101. If, for example, the user 104 uses the non-default actions 199 of input system 159 to activate an "available actions" button, a list of the secondary wireless devices 101 present their operations to wireless device 100 at display system 153.

Secondary wireless devices 101 may also indicate what direction user 104 needs to walk to approach a particular device, using at least proximity information 158. As the user 104 gets closer to some and farther from others of the secondary wireless devices 101 and their operations 111, 121, and 131 reorder themselves on the aggregate user interface 155, e.g., closest devices at the top, until the user 104 get very close at which point the options for only one (the closest) of the secondary wireless devices 101 is presented on the aggregate user interface 155 on display system 153. Thus, the aggregate user interface 155 may be continually updated using at least determination logic 154 and proximity information 158 in wireless device 100. Finally, a user 104 of the device 100 may cause to invoke a default or non-default action (for instance by gesturing, tilting the wireless device, or otherwise indicating a default or non-default action should occur depending on the operations available).

In another example, the wireless device 100 may make a determination about the locations of the secondary wireless devices 101. The locations may be communicated, e.g., from the secondary wireless devices 101, to a central device (not shown) that may compute proximities and transmit to the wireless device 100, or also to one or more of the secondary wireless devices 101. One or more of the secondary wireless devices 101 may also use the location of the wireless device 100 to transmit its proximity 106 or location to it. In this example, the secondary wireless devices 101 might not transmit proximity 106 or location information at all, but instead decide for itself what commands, it wants to transmit to the wireless device 100. Alternatively, some secondary wireless devices 101 might, in addition to transmitting enough location information for the wireless device 100 to determine proximity 106, also transmit specific information (such as subsets of options or commands) based on the determination of proximity 106 from the secondary wireless devices 101.

Figure 2:
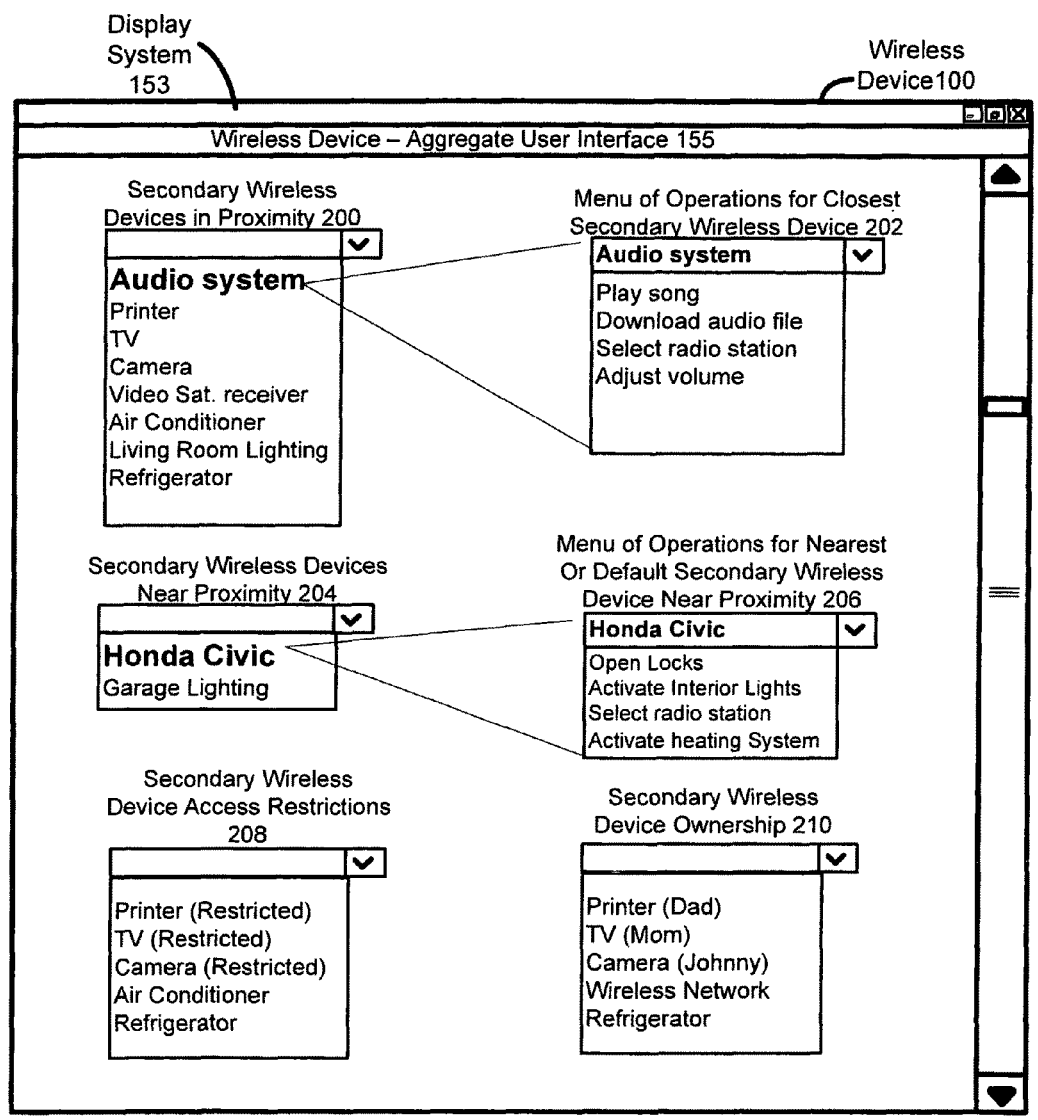
FIG. 2 illustrates certain alternative embodiments of the wireless device with an aggregate user interface of FIG. 1.

FIG. 2 illustrates certain alternative embodiments of the wireless device 100 of FIG. 1. FIG. 2 includes a wireless device 100, a display system 153, an aggregate user interface 155, and a plurality of menus 200, 202, 204, 206, 208, and 210. Menus 200-210 may correspond, for instance to menu 156 of FIG. 1.

Menu 200 comprises a list of secondary wireless devices that are in proximity with wireless device 100. In this example that includes an audio system, a printer, a TV, a camera, a video satellite receiver, an air conditioner, the living room lighting, and a refrigerator. In this example, the audio system is the closest secondary wireless device, so its operations are shown in menu 202, which include in this example, "play song", "download audio file", "select radio station", and "adjust volume".

Menus 204 and 206 are also shown on aggregate user interface 155. Menu 204 includes the secondary wireless devices 101 that are near but not yet in proximity 106 with a user's wireless device 100. In this example, the user is walking toward a garage. As the user 104 walks, the garage lighting and the user's Honda Civic are nearly in proximity 106, and represent secondary wireless devices 101 that will soon probably be available and within proximity 106. The garage lighting and Honda Civic are listed in menu 204. The closest, default, or secondary wireless device 101 deemed most important is listed in menu 206, which is the user's Honda Civic. The user's behavior patterns may have indicated to the wireless device 100 that the Honda Civic is most important, or the user may have specified that information explicitly to wireless device 100, or alternatively menu 206 may be based solely on proximity 106, by listing the closest secondary wireless device 101 as in menu 202.

Menu 208 gives an example of a list that may form part of the aggregate user interface 155, showing the access restrictions for devices that are in proximity 106. In this case, the printer, TV, and camera are restricted, while the air conditioner and refrigerator are available for use. Menu 210 shows secondary wireless device ownership. In menu 210, Dad owns the printer and mom owns the TV. The camera is owned by Johnny, and the wireless network and refrigerator have unspecified ownership and/or are deemed to be owned by anyone capable of establishing a connection with them using a wireless device 100.

Figure 3:
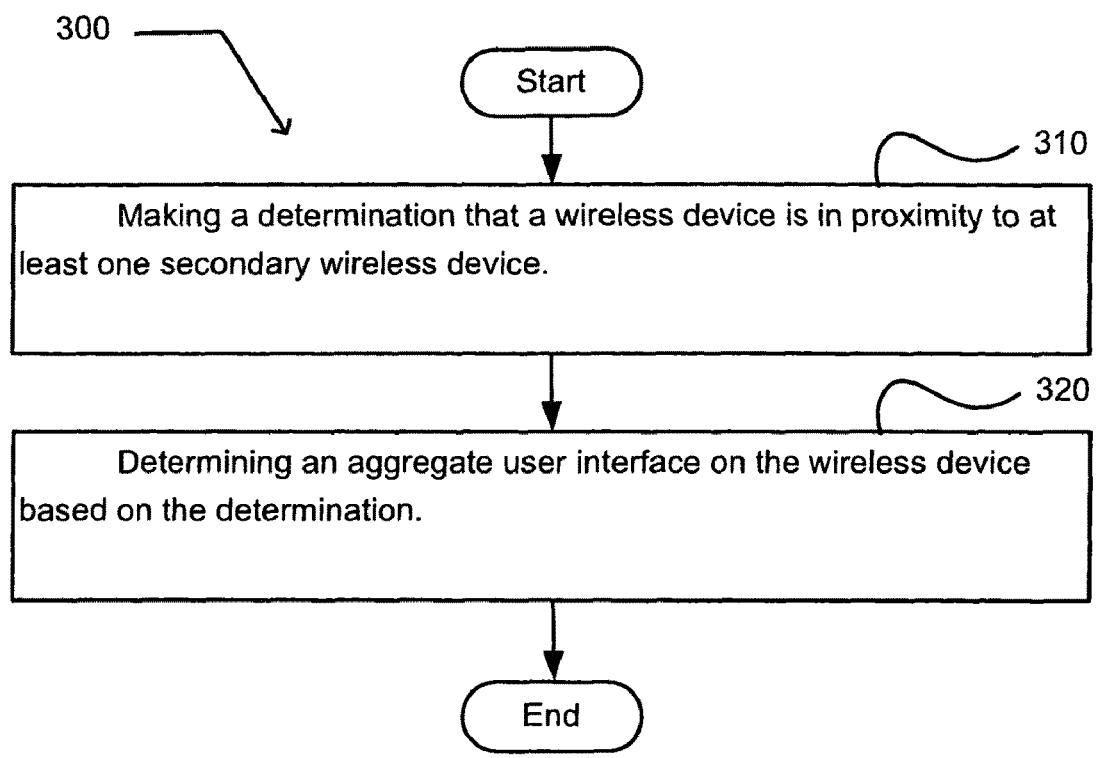
FIG. 3 illustrates an operational flow representing example operations related to a wireless device with an aggregate user interface for controlling other devices.

FIG. 3 illustrates an operational flow 300 representing example operations related to the wireless device with an aggregate user interface for controlling other devices. In FIG. 3 and in following figures that include various examples of operational flows, discussion and explanation may be provided with respect to the above-described examples of FIGS. 1-2, and/or with respect to other examples and contexts. However, it should be understood that the operational flows may be executed in a number of other environments and contexts, and/or in modified versions of FIGS. 1-2. Also, although the various operational flows are presented in the sequence(s) illustrated, it should be understood that the various operations may be performed in other orders than those which are illustrated, or may be performed concurrently.

After a start operation, the operational flow 300 moves to a making operation 310 where a determination is made that a wireless device is in proximity to at least one secondary wireless device. For example, as shown in FIG. 1, controller 160 of wireless device 100 may make a determination that one or more secondary wireless devices 101 are in proximity 106 to wireless device 100 by detecting a touching or contact between the two wireless devices. Alternatively, wireless device 100 may make a determination that it is in proximity 106 or near a secondary wireless device 101 by wirelessly detecting the secondary wireless device 101 and/or establishing a wireless link or connection with the secondary wireless device 101, for example.

In another example embodiment, determination logic 154 of device 100 may make a determination that device 100 is in proximity to a secondary wireless device 101, e.g., based on device contact or based on a wireless link that may be established via transceiver 157 to the secondary wireless device 101. Based on this determination, proximity information 158 may be updated to indicate that this secondary device is in proximity 106, e.g., identifying the device, its location or distance, etc. Alternatively, a wireless link may be established or contact detected, which may cause proximity information 158 to be updated. Determination logic 154 may then make a determination that the secondary wireless device 101 is not in proximity 106 to wireless device 100 based on this proximity information 158, for example, and/or in combination with additional information from controller 160.

Then, in a determining operation 320, an aggregate user interface on the wireless device is determined based on the determination. For example, one or more information elements may be provided on display system 153, e.g., based on the at least one secondary wireless device 101 that is in proximity 106 to the wireless device 100. The aggregate user interface 155 may be displayed on display system 153, e.g., including a menu of operations that may be performed for one or more of the secondary wireless devices 101. In addition, display system 153 may include an aggregate user interface 155 that may be formed in a variety of different ways, such as shown and described in the examples of FIG. 1, including using a menu 156. Proximity information 158 may be used with determination logic 154 to combine a plurality of operations 111, 121, and 131 that are available on the secondary wireless devices 101 and combine or aggregate them into a single menu or a plurality of menus as an aggregate user interface 155 on display system 153 of the wireless device 100, for example.

An operation(s) may be performed related either to a local or remote storage of the digital data, or to another type of transmission of the digital data. As discussed herein, in addition to accessing, querying, recalling, or otherwise obtaining the digital data for the making or determining operation, operations may be performed related to storing, sorting, identifying, associating, or otherwise archiving the digital data to a memory, including, for example, sending and/or receiving a transmission of the digital data from a remote memory. Accordingly, any such operation(s) may involve elements including at least an operator (e.g., either human or computer) directing the operation, a transmitting computer, and/or a receiving computer, and should be understood to occur within the United States as long as at least one of these elements resides in the United States.

Figure 4:
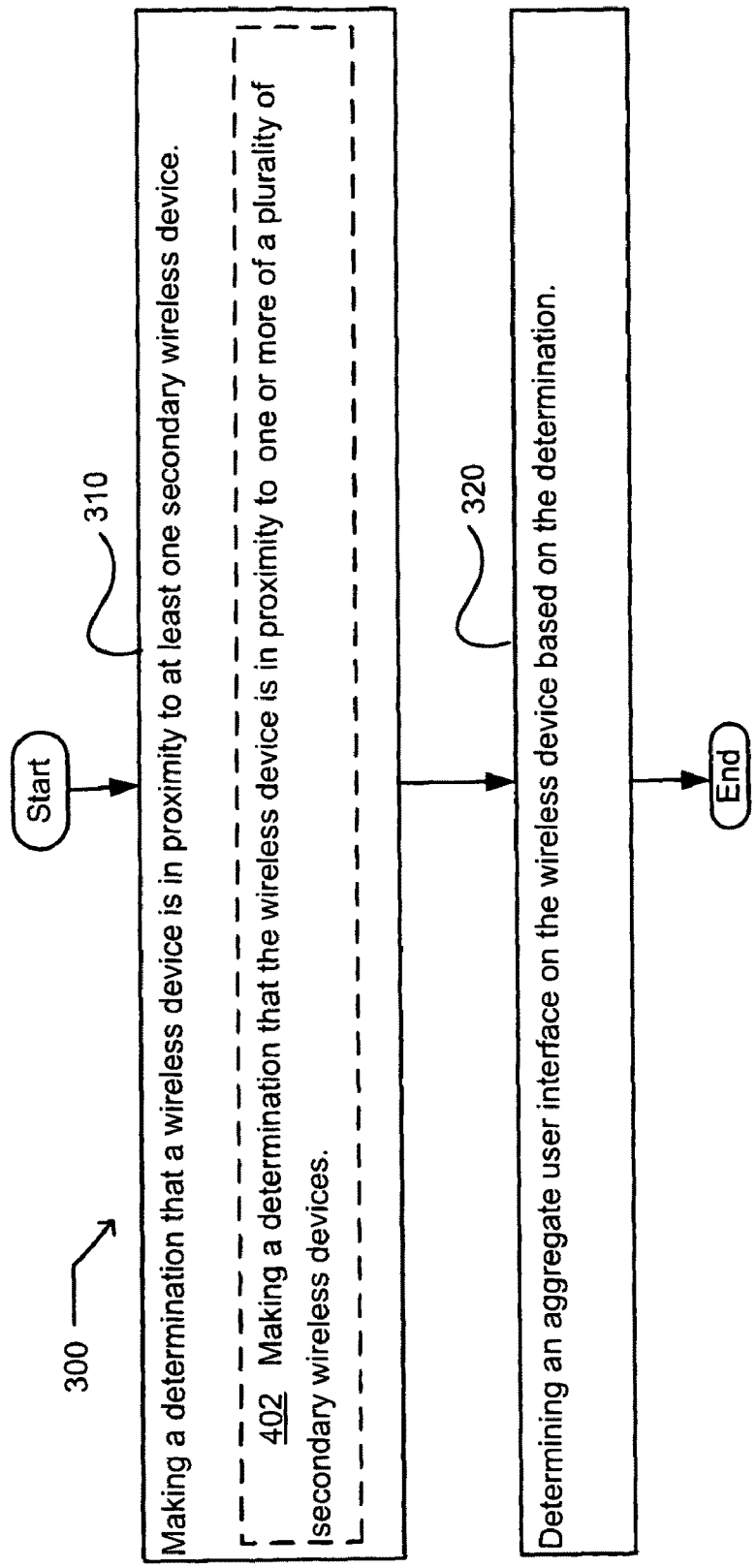
FIG. 4 illustrates an alternative embodiment of the example operational flow of FIG. 3.

FIG. 4 illustrates alternative embodiments of the example operational flow 300 of FIG. 3. FIG. 4 illustrates example embodiments where the making operation 310 may include at least one additional operation. Additional operations may include an operation 402.

At the operation 402 a determination is made that the wireless device is in proximity to one or more of a plurality of secondary wireless devices. For example, as shown in FIG. 1, controller 160 of wireless device 100 may make a determination that one or more secondary wireless devices 101 are in proximity to wireless device 100 by detecting a touching or contact between the two wireless devices. Alternatively, wireless device 100 may make a determination that it is in proximity 106 or near a secondary wireless device 101 by wirelessly detecting the secondary wireless device 101 and/or establishing a wireless link or connection with the secondary wireless device 101, for example. Other methods known to those skilled in the art may be used including a Bluetooth connection, an 802.11(a)-(g) type connection, a satellite connection, an RF connection, an IR connection, or any other connection.

Figure 5:
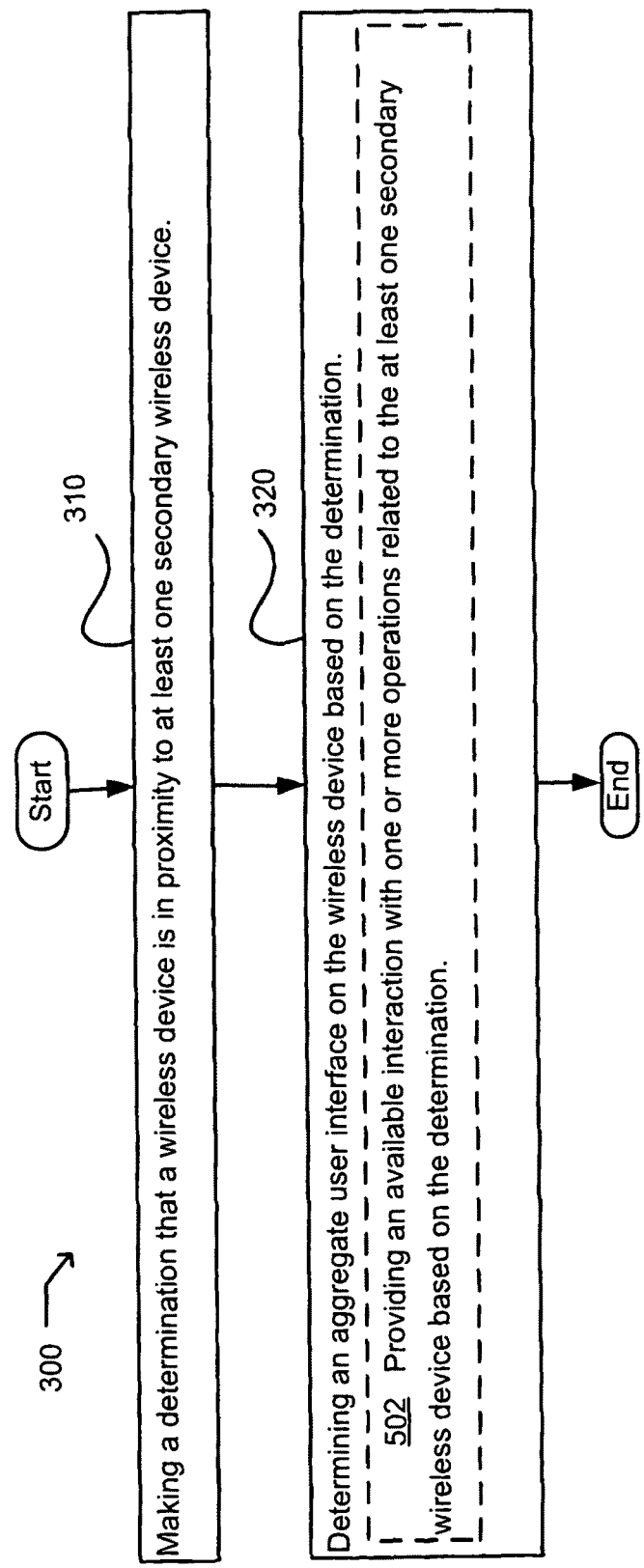
FIG. 5 illustrates an alternative embodiment of the example operational flow of FIG. 3.

FIG. 5 illustrates alternative embodiments of the example operational flow 300 of FIG. 3. FIG. 5 illustrates example embodiments where the determining operation 320 may include at least one additional operation. Additional operations may include an operation 502.

At the operation 502 an available interaction is provided with one or more operations related to the at least one secondary wireless device based on the determination. Interactions include, for example, menu choices 200-210 shown in FIG. 2. The available interactions may be used to represent operations 111, 121, and 131 of FIG. 1 that are available to be controlled by a user 104 via a wireless device 100. For example, a cable set-top box might offer the operations "Order Pay Per View", "Change Channel", "Record Show", and the like.

Figure 6:
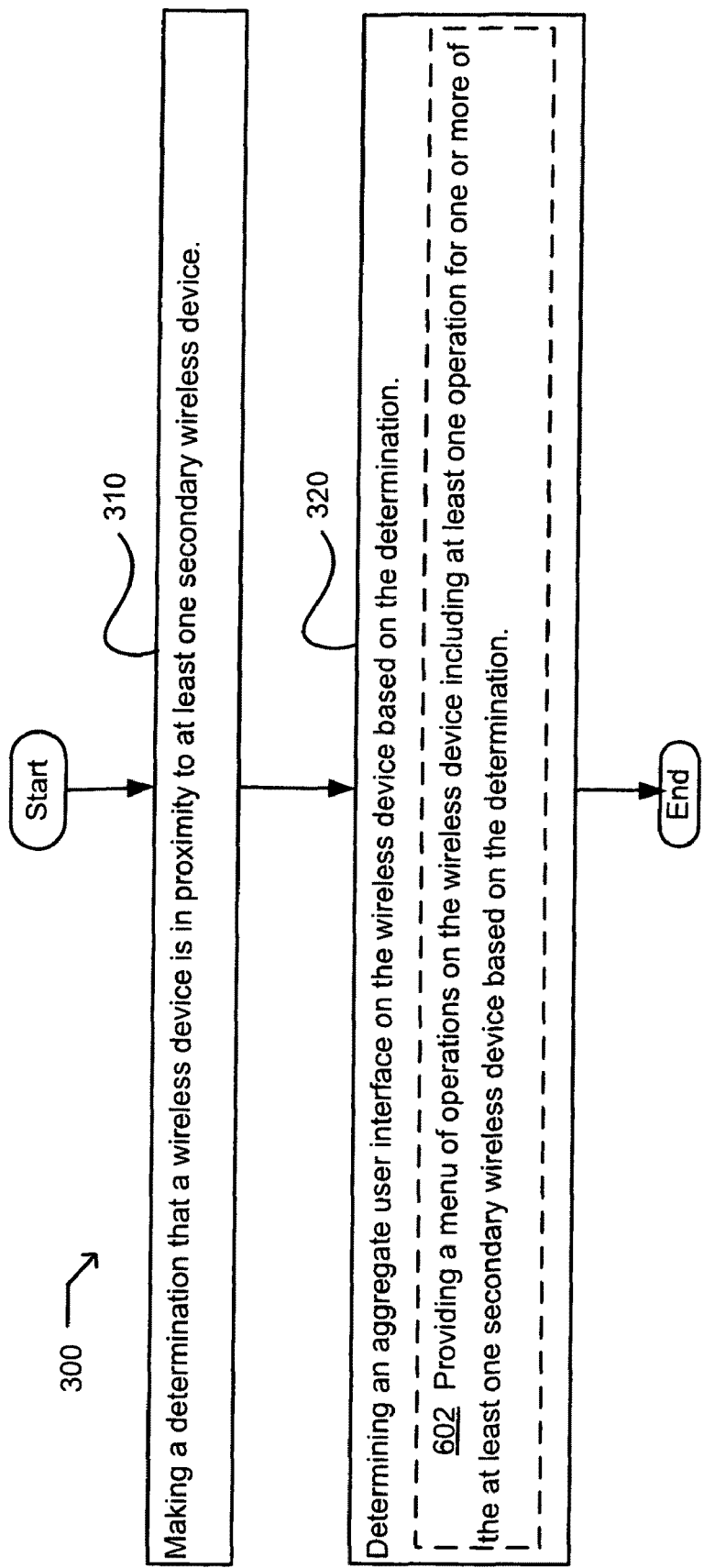
FIG. 6 illustrates an alternative embodiment of the example operational flow of FIG. 3.

FIG. 6 illustrates alternative embodiments of the example operational flow 300 of FIG. 3. FIG. 6 illustrates example embodiments where the determining operation 320 may include at least one additional operation. Additional operations may include an operation 602.

At the operation 602 a menu of operations is provided on the wireless device including at least one operation for one or more of the at least one secondary wireless device based on the determination. For example, menu choices 200-210 give a partial example of some of the menus that may be provided in the aggregate user interface 155. Operations 111, 121, 131 are specific to each of the secondary wireless devices 101. For instance, a CD player may have the operations "play", "stop", and "pause", while a printer may have the operations "print color", "print black and white", or "setup".

Figure 7:
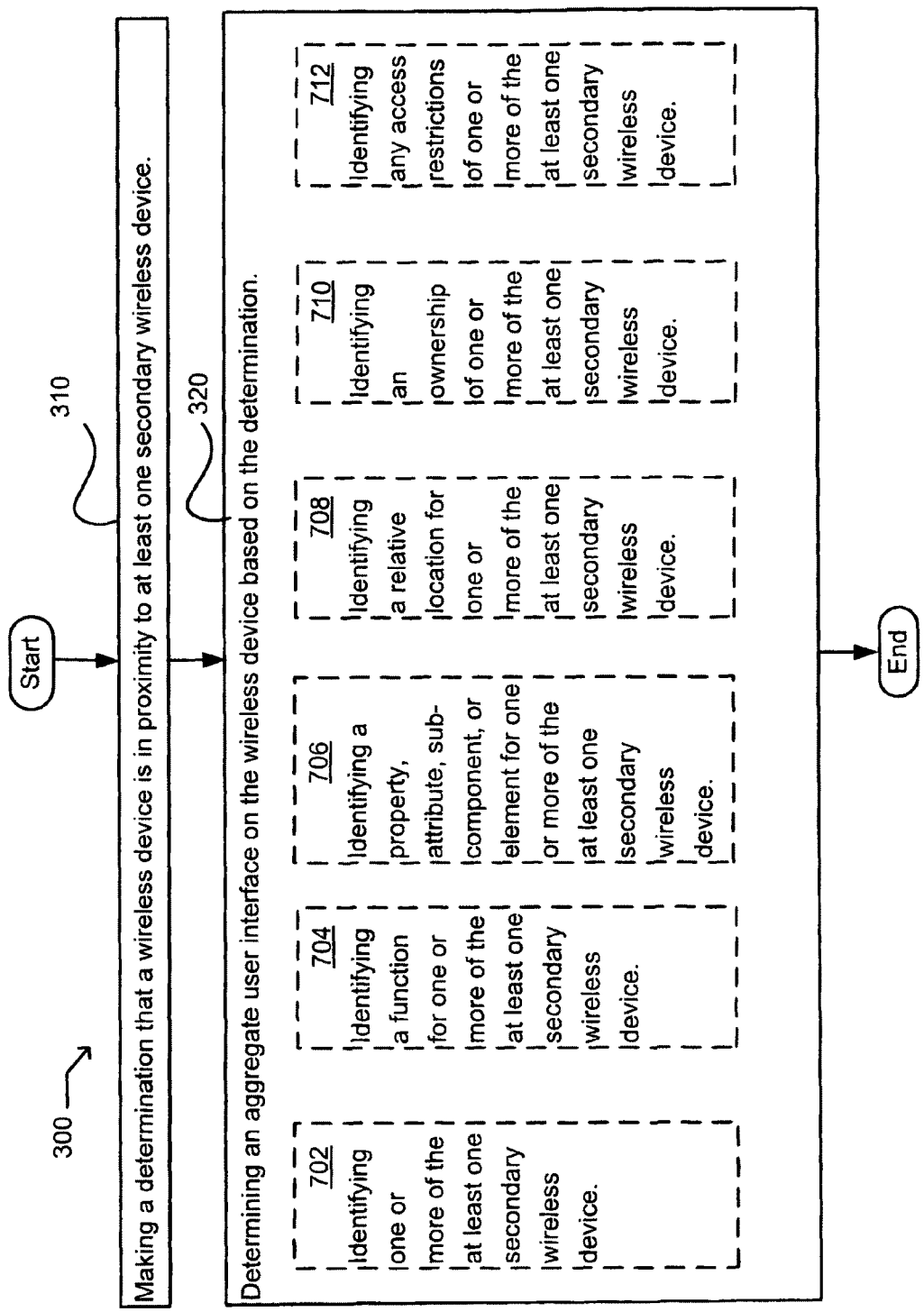
FIG. 7 illustrates an alternative embodiment of the example operational flow of FIG. 3.

FIG. 7 illustrates alternative embodiments of the example operational flow 300 of FIG. 3. FIG. 7 illustrates example embodiments where the determining operation 320 may include at least one additional operation. Additional operations may include an operation 702, operation 704, operation 706, operation 708, operation 710, and/or operation 712.

At the operation 702 one or more of the at least one secondary wireless devices are identified. The identification process may occur, for example by the wireless device 100, by the secondary wireless devices 101, a combination of both, or alternatively using an external observer object for facilitating such an exchange. In some of the scenarios, the user's wireless device 100 identifies the secondary wireless devices 101 passively and is essentially a receiver of the identification information and uses its determination logic 154 and/or proximity information 158 to complete the identification process.

At the operation 704 a function for one or more of the at least one secondary wireless device is identified. The functions, for example, may represent operations 111, 121, and 131 that are available on the secondary wireless devices 101.

At the operation 706 a property, attribute, or sub-component for one or more of the at least one secondary wireless device is identified. The property, attribute, or sub-component for one or more of the at least one secondary wireless device 101 may be used, for example, to determine an aggregate user interface 155 on the wireless device 100.

At the operation 708 a relative location for one or more of the at least one secondary wireless devices is identified. The relative location may be used, for example, to determine an updated aggregate user interface 155 on the wireless device 100, which may give precedence, for example, to devices that are closer to the user, since those are the devices the user 104 most likely wants to use.

At the operation 710 the ownership for one or more of the at least one secondary wireless device is identified. The ownership may be used, for example, to determine an aggregate user interface 155 on the wireless device 100, which may comprise information related to the owner's of the devices in proximity 106. Devices not owned by the user 104 may be inaccessible and hence, not as relevant when determining an aggregate user interface 155.

At the operation 712 any access restrictions for one or more of the at least one secondary wireless device is identified. The access restrictions may be used, for example, to determine an aggregate user interface 155 on the wireless device 100, which may comprise information related to which of the devices in the proximity 106 are devices that the user will be able to access.

Figure 8:
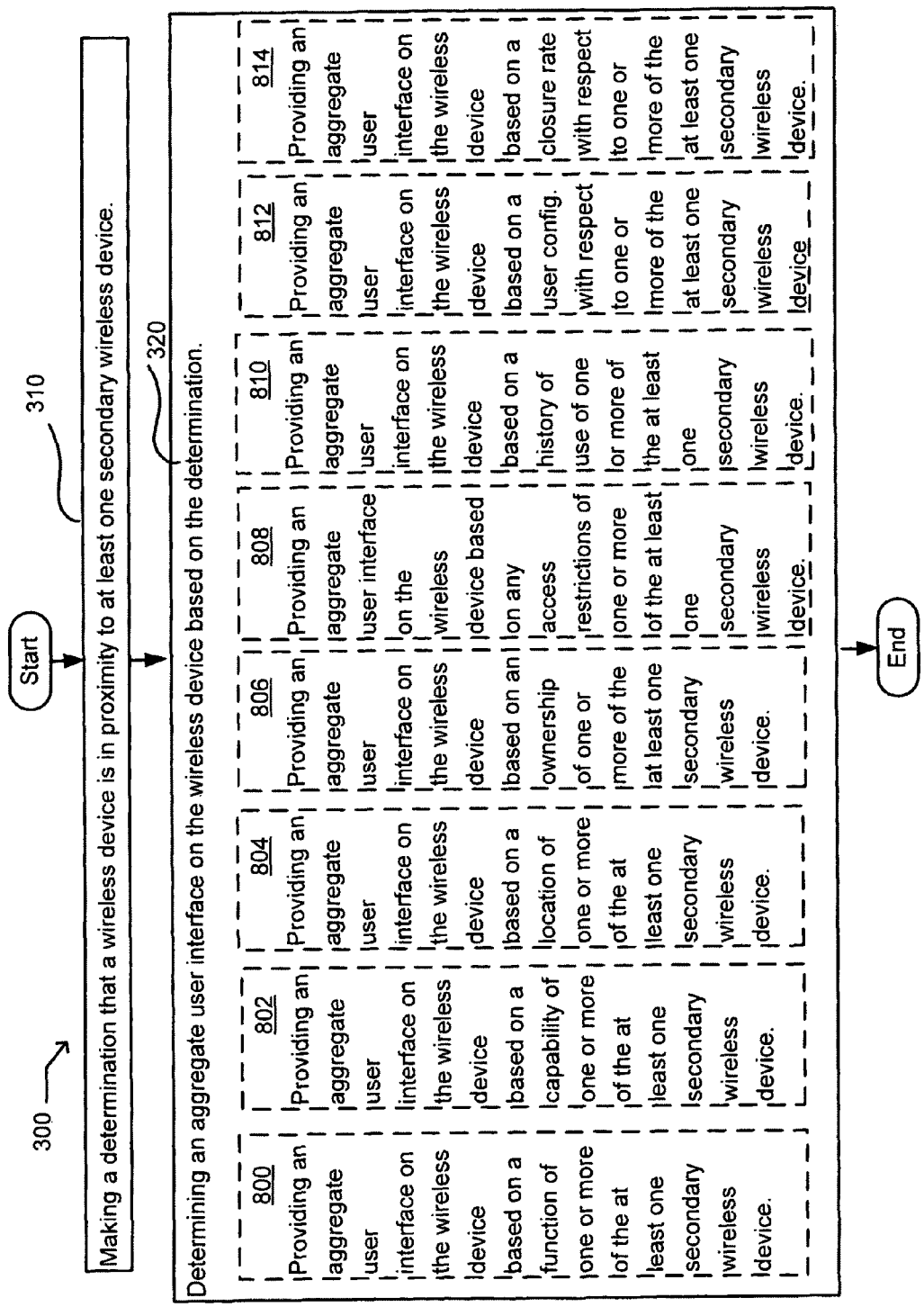
FIG. 8 illustrates an alternative embodiment of the example operational flow of FIG. 3.

FIG. 8 illustrates alternative embodiments of the example operational flow 300 of FIG. 3. FIG. 8 illustrates example embodiments where the determining operation 320 may include at least one additional operation. Additional operations may include an operation 800, operation 802, operation 804, operation 806, operation 808, operation 810, operation 812 and/or operation 814.

At the operation 800 an aggregate user interface is provided on the wireless device based on a function of one or more of the at least one secondary wireless devices. For example, using the wireless device 100, the secondary wireless devices 101, a combination of both, or alternatively using an external observer object for facilitating such an exchange, the functions for all or some of the secondary wireless devices 101 are used to create an aggregate user interface 155 that may combine all of the available operations into one or more menus.

At the operation 802 an aggregate user interface is provided on the wireless device based on a capability of one or more of the at least one secondary wireless device. For example, certain capacity devices may be treated differently when the aggregate user interface 155 is determined. At the operation 804 an aggregate user interface is provided on the wireless device based on a location of one or more of the at least one secondary wireless device. For example, certain locations of devices may be treated differently when the aggregate user interface 155 is determined (i.e., closer devices may be reordered to a higher position in the combined user interface.). At the operation 806 an aggregate user interface is provided on the wireless device based on an ownership of one or more of the at least one secondary wireless device. For example, certain ownerships of devices may cause them to be treated differently when the aggregate user interface 155 is determined (i.e., devices the currently logged in user does not own may be removed or pushed down in the aggregate user interface 155).

At the operation 808 an aggregate user interface is provided on the wireless device based on an access restriction of one or more of the at least one secondary wireless device. Devices that are restricted from the current user 104 may be less relevant when determining an aggregate user interface 155. At the operation 810 an aggregate user interface 155 is provided on the wireless device 100 based on a history of use of one or more of the at least one secondary wireless devices 101. For example, if a device has not been used for a long enough period of time it may be dropped from the aggregate user interface 155 altogether. At the operation 812 an aggregate user interface is provided on the wireless device based on a user configuration with respect to one or more of the at least one secondary wireless device. For example, a user configuration may be used to customize the aggregate user interface 155. At the operation 814 an aggregate user interface is provided on the wireless device based on a closure rate of one or more of the at least one secondary wireless device. For example, objects with a closure rate indicating they are near proximity 106 may be pushed high in the aggregate user interface 155 when it is determined, because those are devices the user is likely intending to use in the near future.

Figure 9:
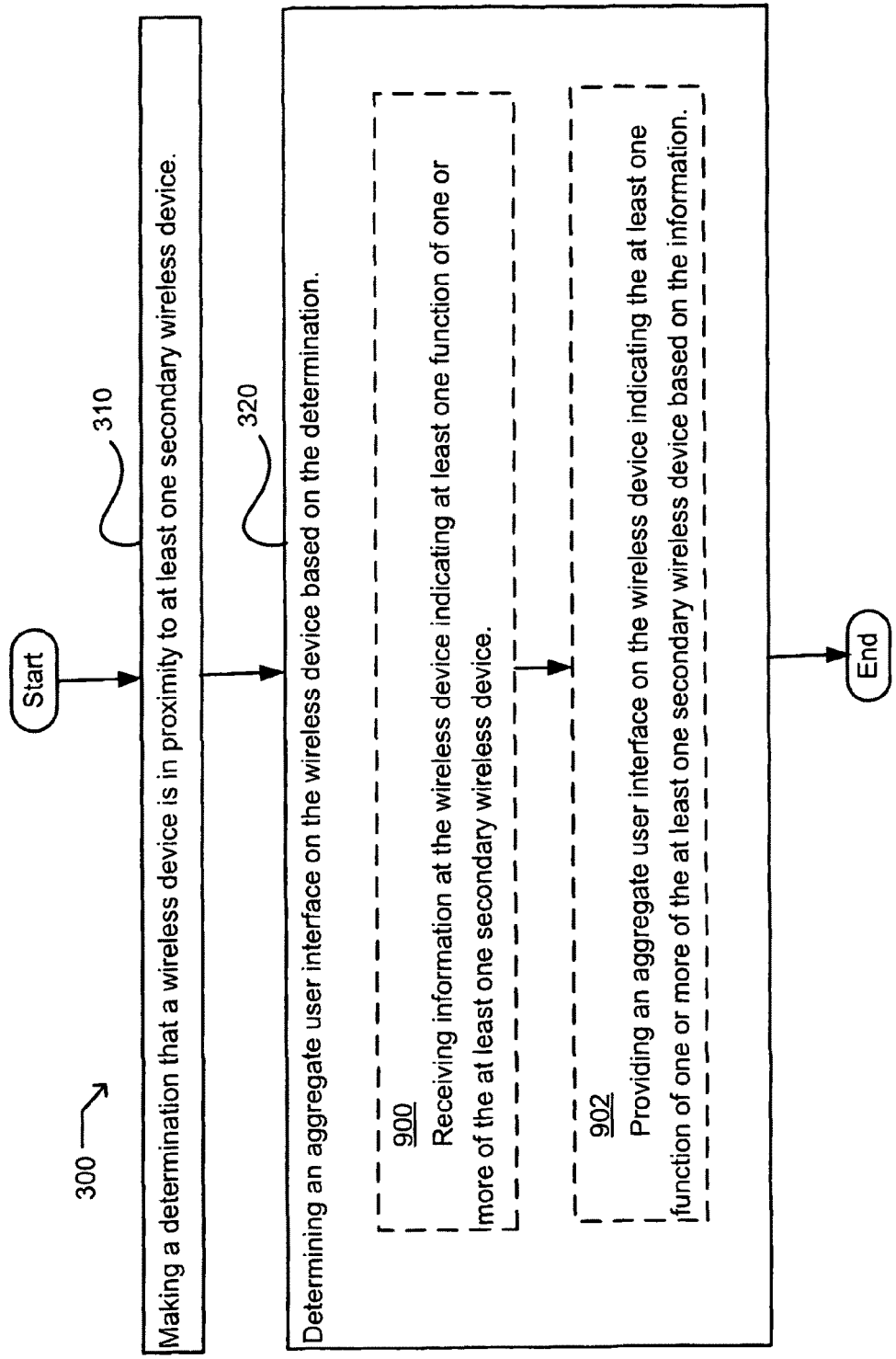
FIG. 9 illustrates an alternative embodiment of the example operational flow of FIG. 3.

FIG. 9 illustrates alternative embodiments of the example operational flow 300 of FIG. 3. FIG. 9 illustrates example embodiments where the determining operation 320 may include at least one additional operation. Additional operations may include an operation 900, and/or operation 902.

At the operation 900 information is received at the wireless device indicating at least one function of one or more of the at least one secondary wireless device. Functions may include, for example, the available interactions that the user may have with the secondary wireless devices 101 which are in proximity 106 to the wireless device 100.

At the operation 902 an aggregate user interface is provided on the wireless device indicating the at least one function of one or more of the at least one secondary wireless device based on the information. The wireless device 100 may, for example, use determination logic 154 in conjunction with proximity information 158 in order to present the functions in the aggregate user interface 155 in a more intuitive manner, for instance, closer devices can be displayed higher in the menu.

Figure 10:
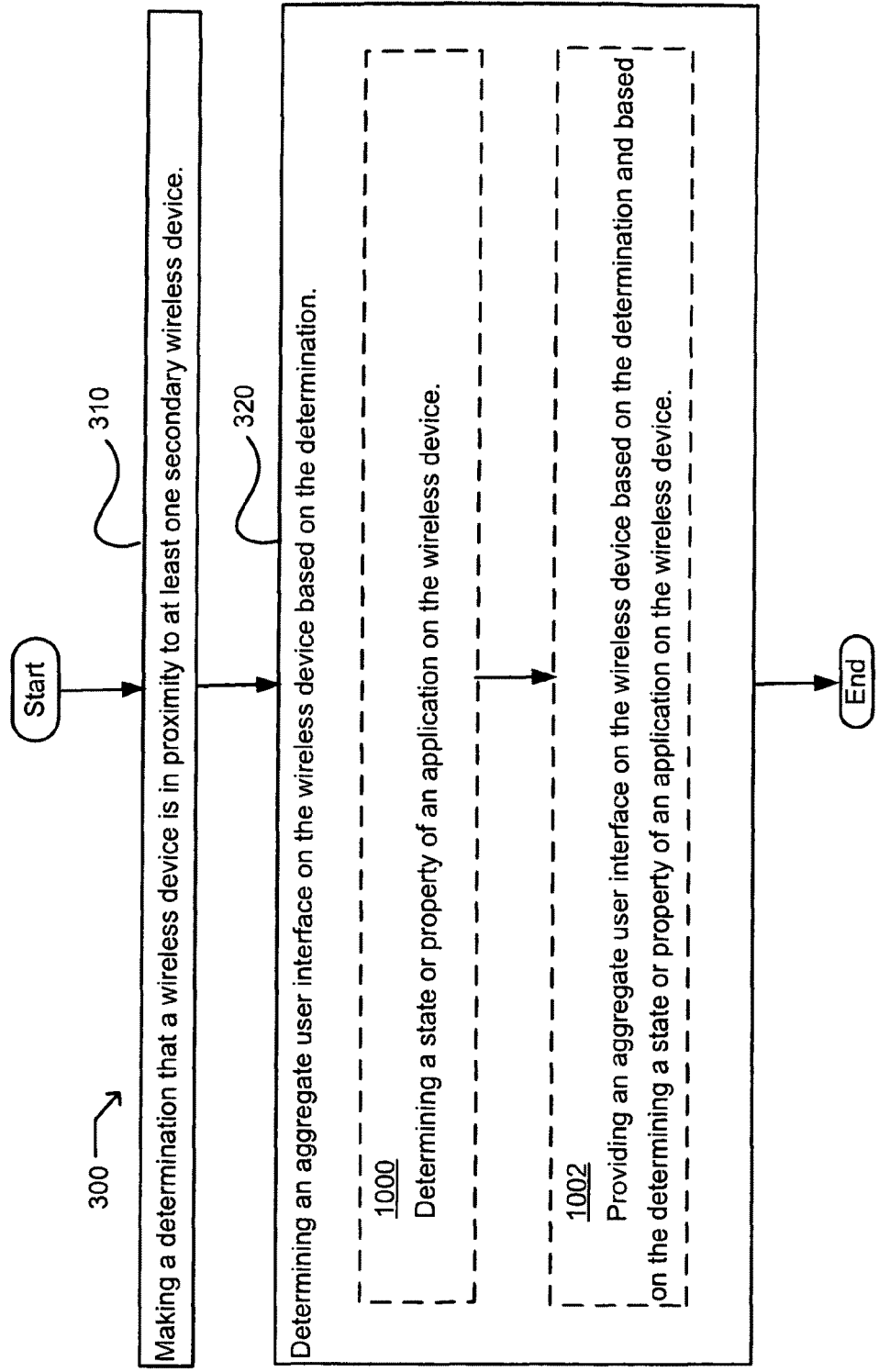
FIG. 10 illustrates an alternative embodiment of the example operational flow of FIG. 3.

FIG. 10 illustrates alternative embodiments of the example operational flow 300 of FIG. 3. FIG. 10 illustrates example embodiments where the determining operation 320 may include at least one additional operation. Additional operations may include an operation 1000 and/or operation 1002.

At the operation 1000 a state or property of an application on the wireless device is determined. The open applications may, for example, provide indicators to the system as to how default operations should take place when a wireless device 100 with such an open application is in proximity 106 to a secondary wireless device 101.

At the operation 1002 an aggregate user interface on the wireless device is provide based on the determination and based on the determining a state or property of an application on the wireless device. For example, the user 104 may have a web browser application executing on the wireless device 100 and the web browser is pointed to the "Anaheim Angels" baseball team website. If the user 104 takes the wireless device 100 toward proximity 106 and makes a connection with a TV with a record live television function, then the automatic invocation system 198 may automatically schedule the Anaheim Angels baseball game to be recorded, if such a game is found in the program guide or other data.

Figure 11:
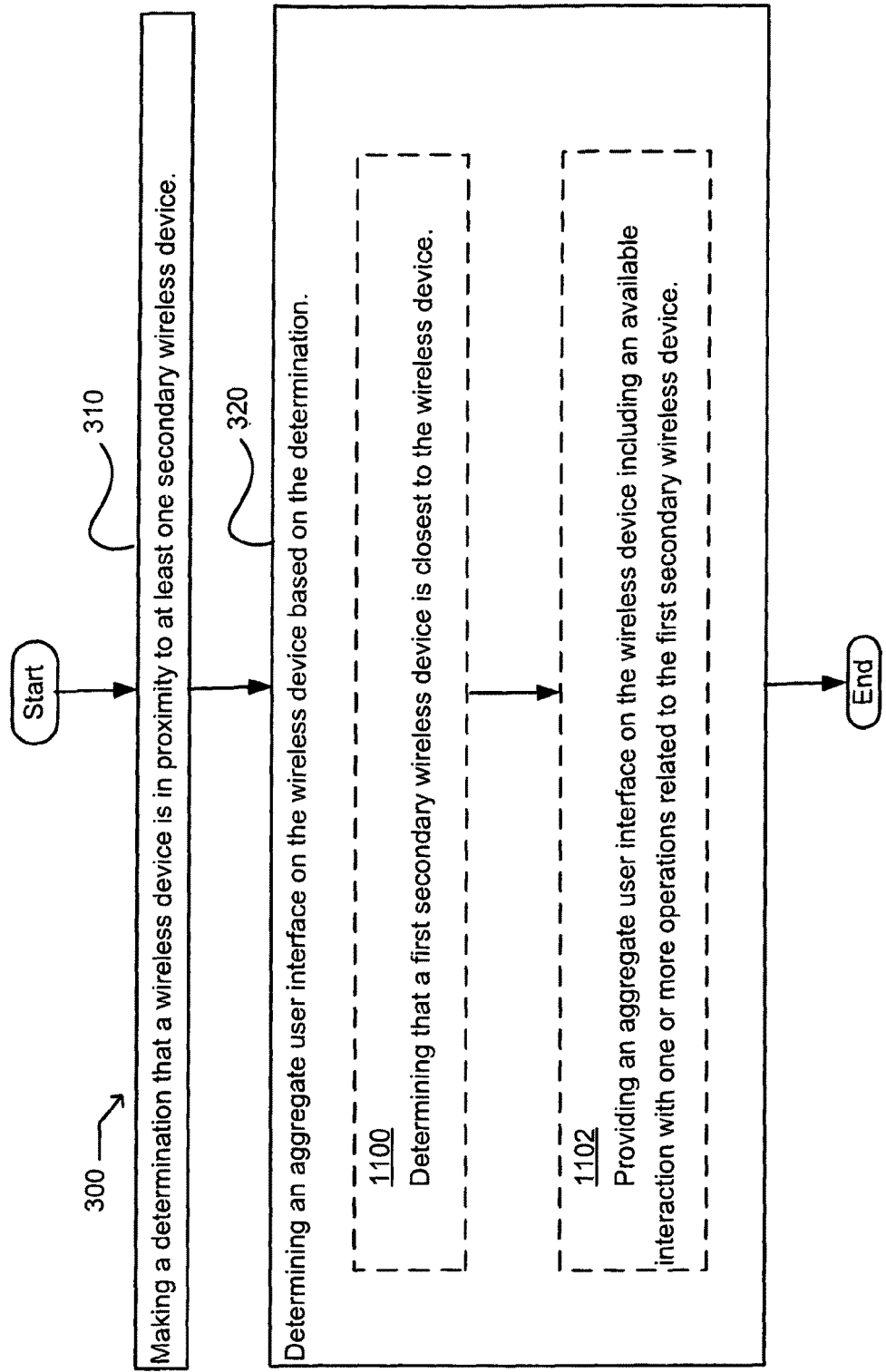
FIG. 11 illustrates an alternative embodiment of the example operational flow of FIG. 3.

FIG. 11 illustrates alternative embodiments of the example operational flow 300 of FIG. 3. FIG. 11 illustrates example embodiments where the determining operation 320 may include at least one additional operation. Additional operations may include an operation 1100 and/or operation 1102.

At the operation 1100 it is determined that a first secondary wireless device is closest to the wireless device. At the operation 1102 an aggregate user interface is provided on the wireless device including an available interaction with one or more operations related to the first secondary wireless device. For example, as the user 104 walks toward a CD player and the CD player becomes the closest secondary wireless device 101, an aggregate user interface 155 may be provided on the wireless device 100 giving the users the options, for instance, "Play" and "Eject" most prominently.

Figure 12:
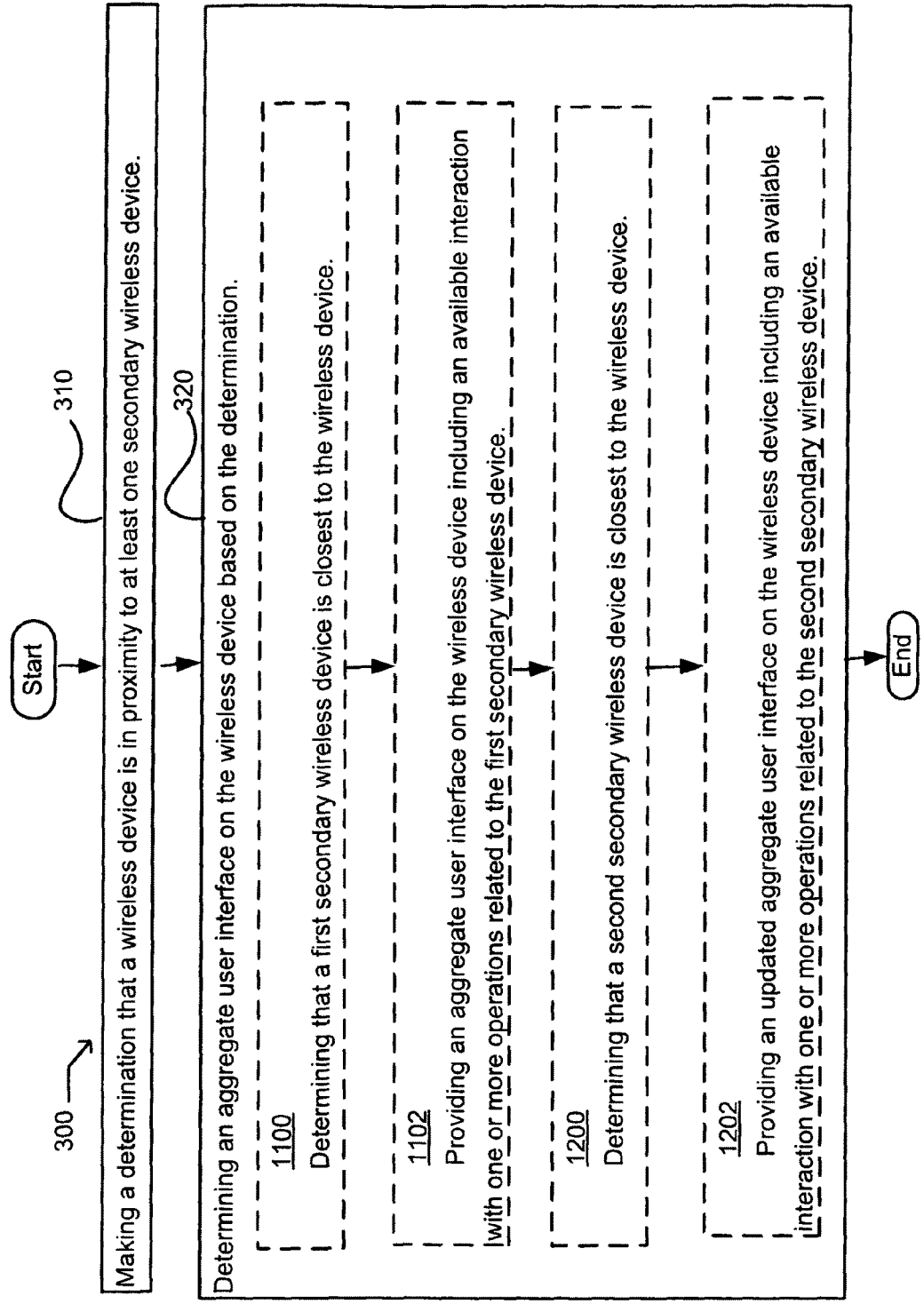
FIG. 12 illustrates an alternative embodiment of the example operational flow of FIG. 3.

FIG. 12 illustrates alternative embodiments of the example operational flow 300 of FIG. 3. FIG. 12 illustrates example embodiments where the determining operation 320 may include at least one additional operation. Additional operations may include an operation 1200 and operation 1202.

At the operation 1200 it is determined that a second secondary wireless device is closest to a wireless device. At the operation 1202 an aggregate user interface is provided on the wireless device including an available interaction with one or more operations related to the second secondary wireless device.

For example, as previously described, the user 104 walks toward a CD player and the CD player becomes the closest secondary wireless device 101, an aggregate user interface 155 may be provided on the wireless device 100 giving the user's the options, for instance, "play" and "eject" most prominently. As the user 104 moves away from the CD player, the television may become the closest device, so the aggregate user interface 155 is updated when the new information is determined. A new menu may then be provided on wireless device 100 that includes, for instance, indicating available interaction with one or more operations related to the television, such as "TV ON", "RECORD", and "TV GUIDE," for example.

Figure 13:
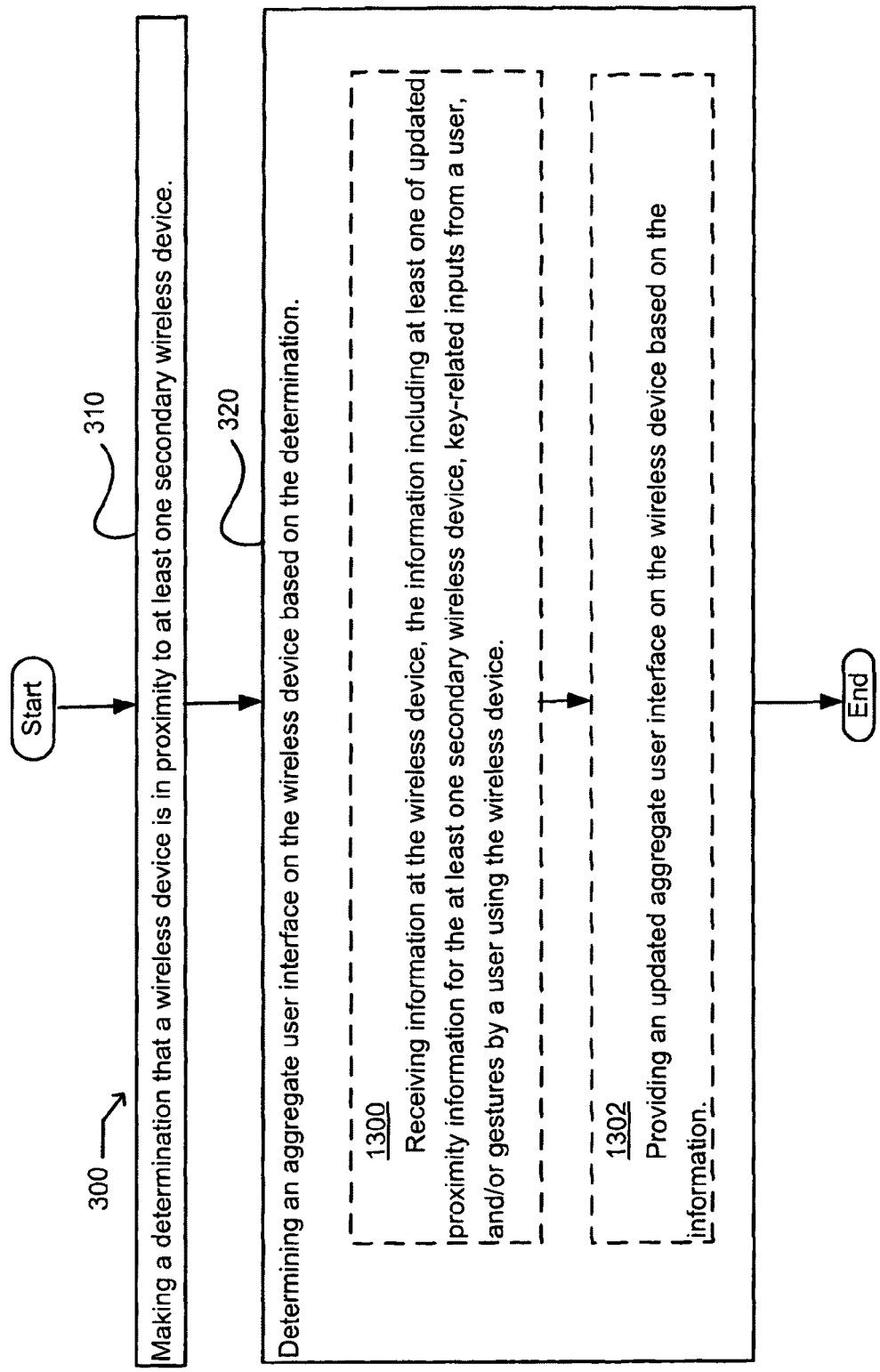
FIG. 13 illustrates an alternative embodiment of the example operational flow of FIG. 3.

FIG. 13 illustrates alternative embodiments of the example operational flow 300 of FIG. 3. FIG. 13 illustrates example embodiments where the determining operation 320 may include at least one additional operation. Additional operations may include an operation 1300 and/or operation 1302.

At the operation 1300 information is received at the wireless device, the information including at least one of updated proximity information for the at least one secondary wireless device, key-related inputs from a user, and/or gestures by a user using the wireless device. At the operation 1302 an updated aggregate user interface is provided on the wireless device based on the information.

Figure 14:
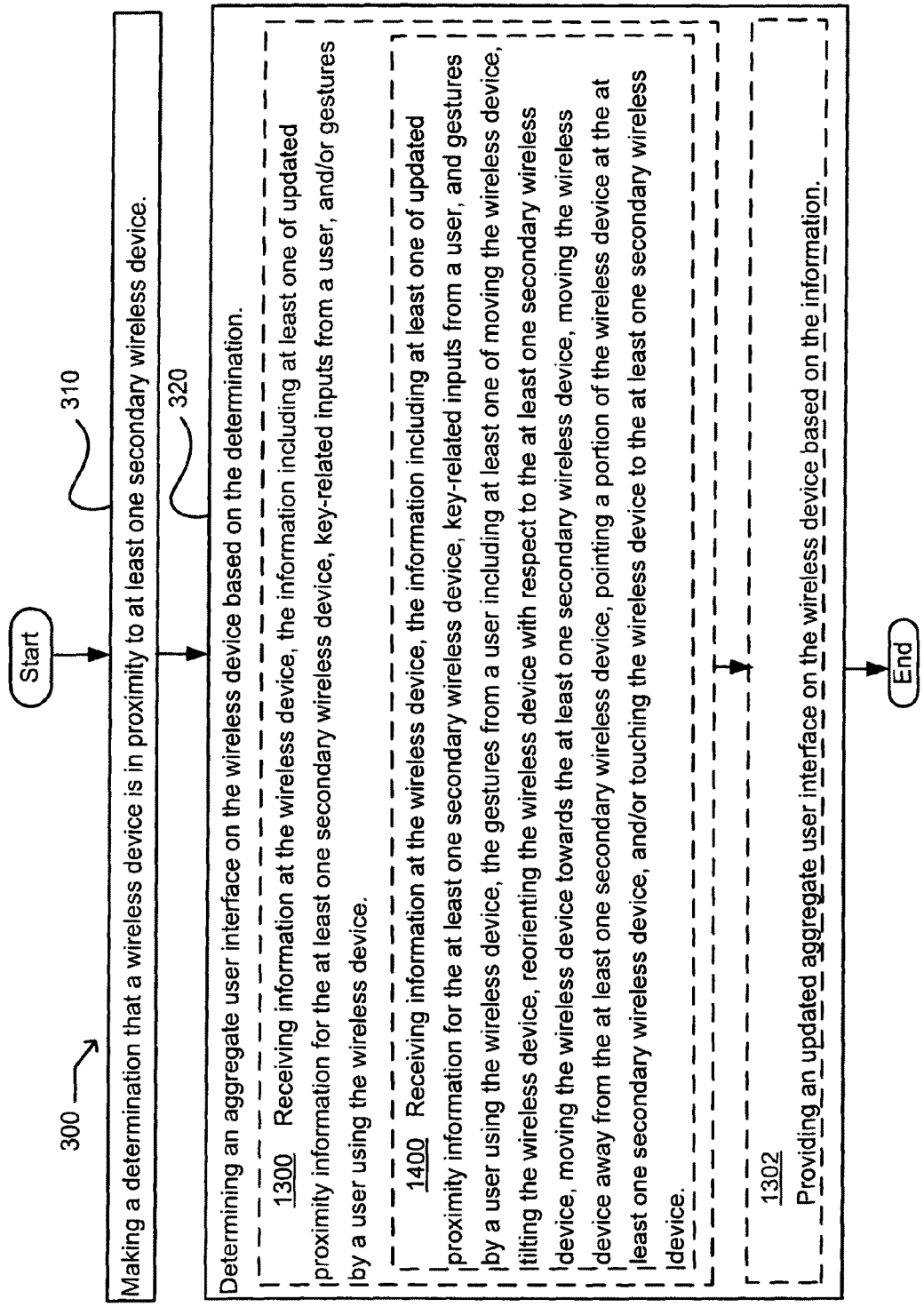

FIG. 14 illustrates alternative embodiments of the example operational flow 300 of FIG. 3. FIG. 14 illustrates example embodiments where the receiving operation 1300 may include at least one additional operation. Additional operations may include an operation 1400.

At the operation 1400 information is received at the wireless device, the information including at least one of updated proximity information for the at least one secondary wireless device, key-related inputs from a user, and gestures by a user using the wireless device, the gestures from a user including at least one of moving the wireless device, tilting the wireless device, reorienting the wireless device with respect to the at least one secondary wireless device, moving the wireless device towards the at least one secondary wireless device, moving the wireless device away from the at least one secondary wireless device, pointing a portion of the wireless device at the at least one secondary wireless device, and/or touching the wireless device to the at least one secondary wireless device.

Figure 15:
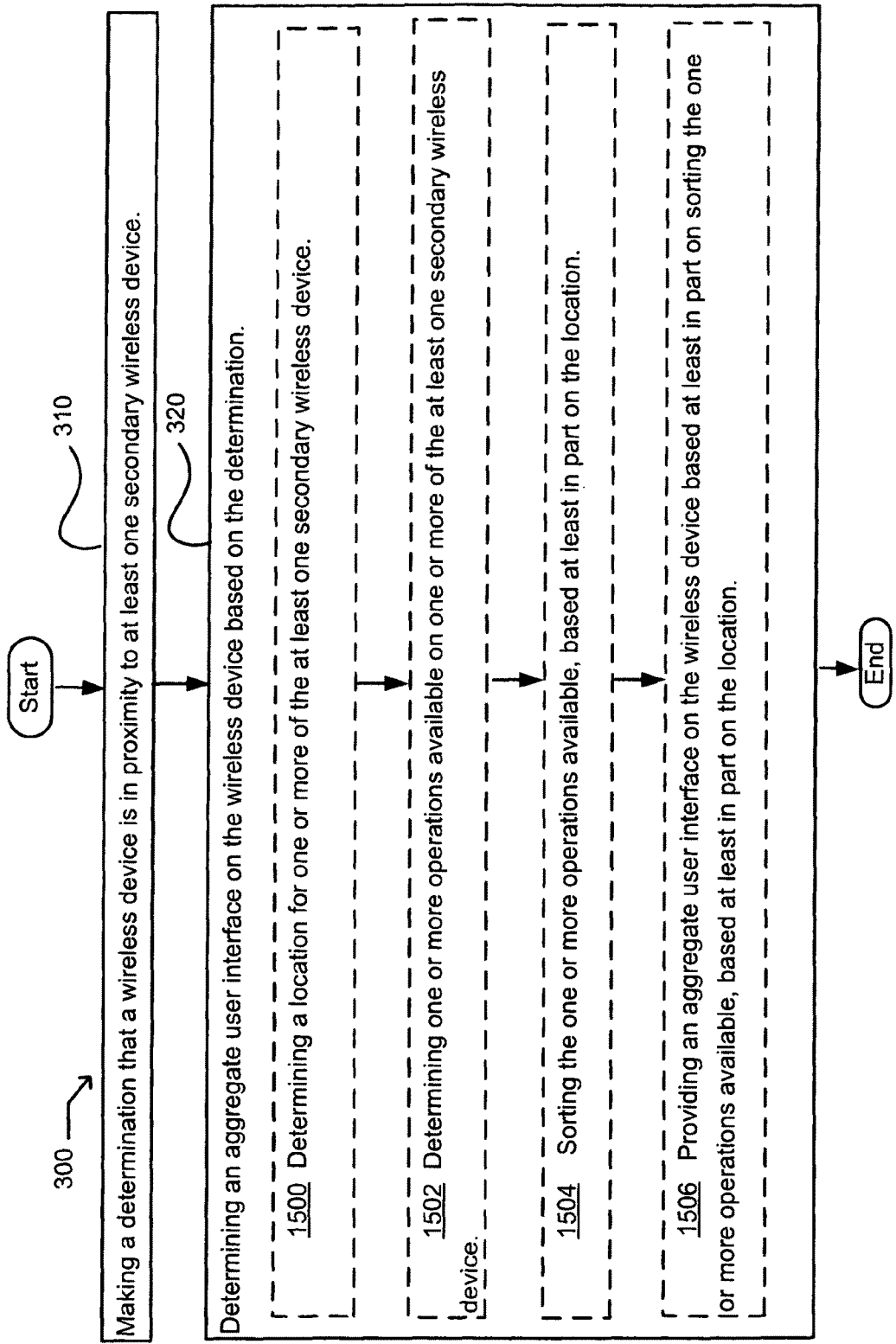

FIG. 15 illustrates alternative embodiments of the example operational flow 300 of FIG. 3. FIG. 15 illustrates example embodiments where the determining operation 320 may include at least one additional operation. Additional operations may include an operation 1500, operation 1502, operation 1504, and/or operation 1506.

At the operation 1500 a location for one or more of the at least one secondary wireless device is determined. At operation 1502 one or more operations available on one or more of the at least one secondary wireless device are determined. At operation 1504 the one or more operations available are sorted, based at least in part on the location. At operation 1506, an aggregate user interface is provided on the wireless device based at least in part on sorting the one or more operations available, based at least in part on the location.

Figure 16:
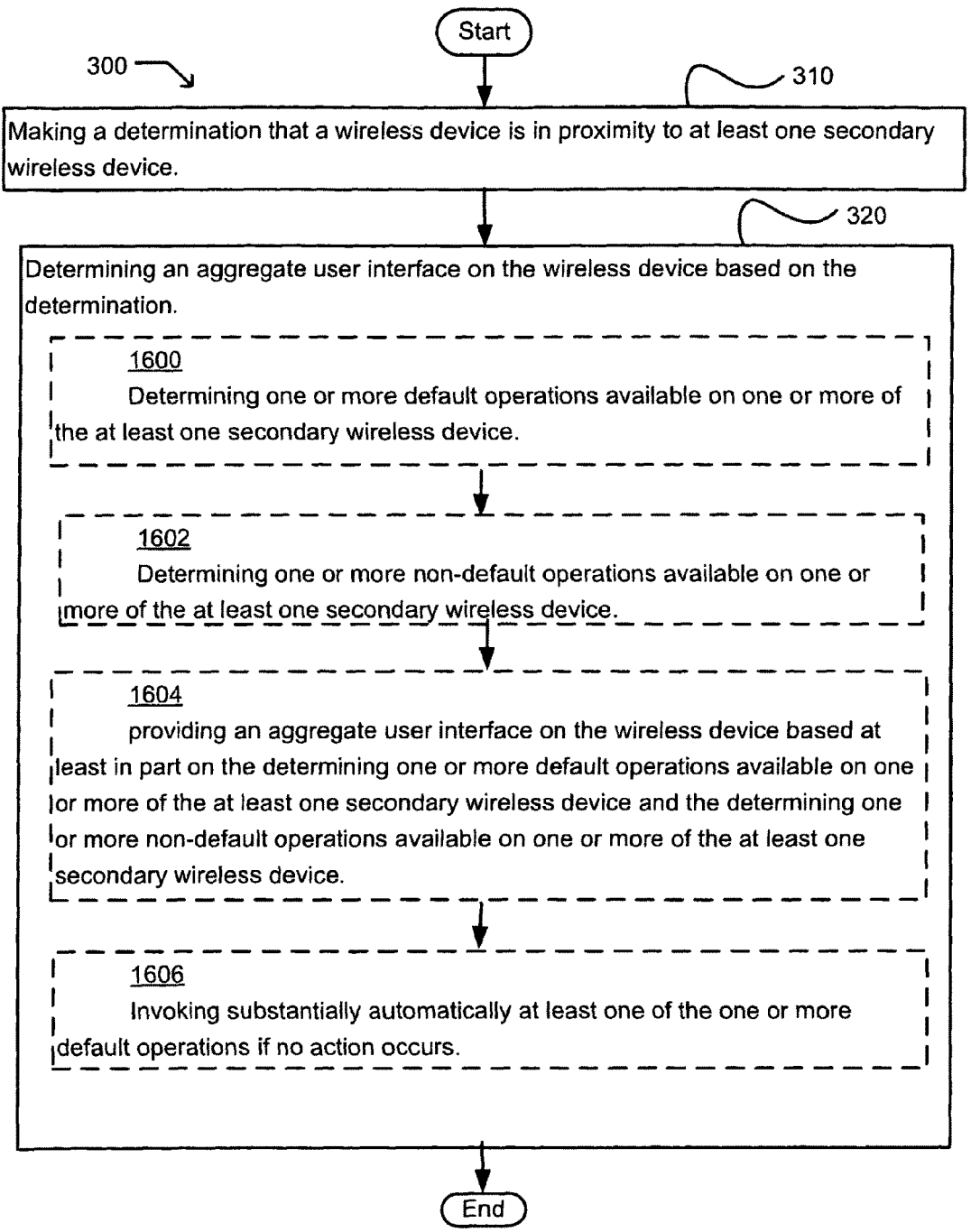

FIG. 16 illustrates alternative embodiments of the example operational flow 300 of FIG. 3. FIG. 16 illustrates example embodiments where the determining operation 320 may include at least one additional operation. Additional operations may include an operation 1600, operation 1602, operation 1604, and/or operation 1606.

At the operation 1600 one or more default operations available on one or more of the at least one secondary wireless device are determined. At operation 1602 one or more non-default operations available on one or more of the at least one secondary wireless device are determined. At operation 1604 an aggregate user interface is provided on the wireless device based at least in part on the determining one or more default operations available on one or more of the at least one secondary wireless device and determining one or more non-default operations available on one or more of the at least one secondary wireless device. At operation 1606, at least one of the one or more default operations are invoked substantially automatically if no action occurs.

Figure 17:
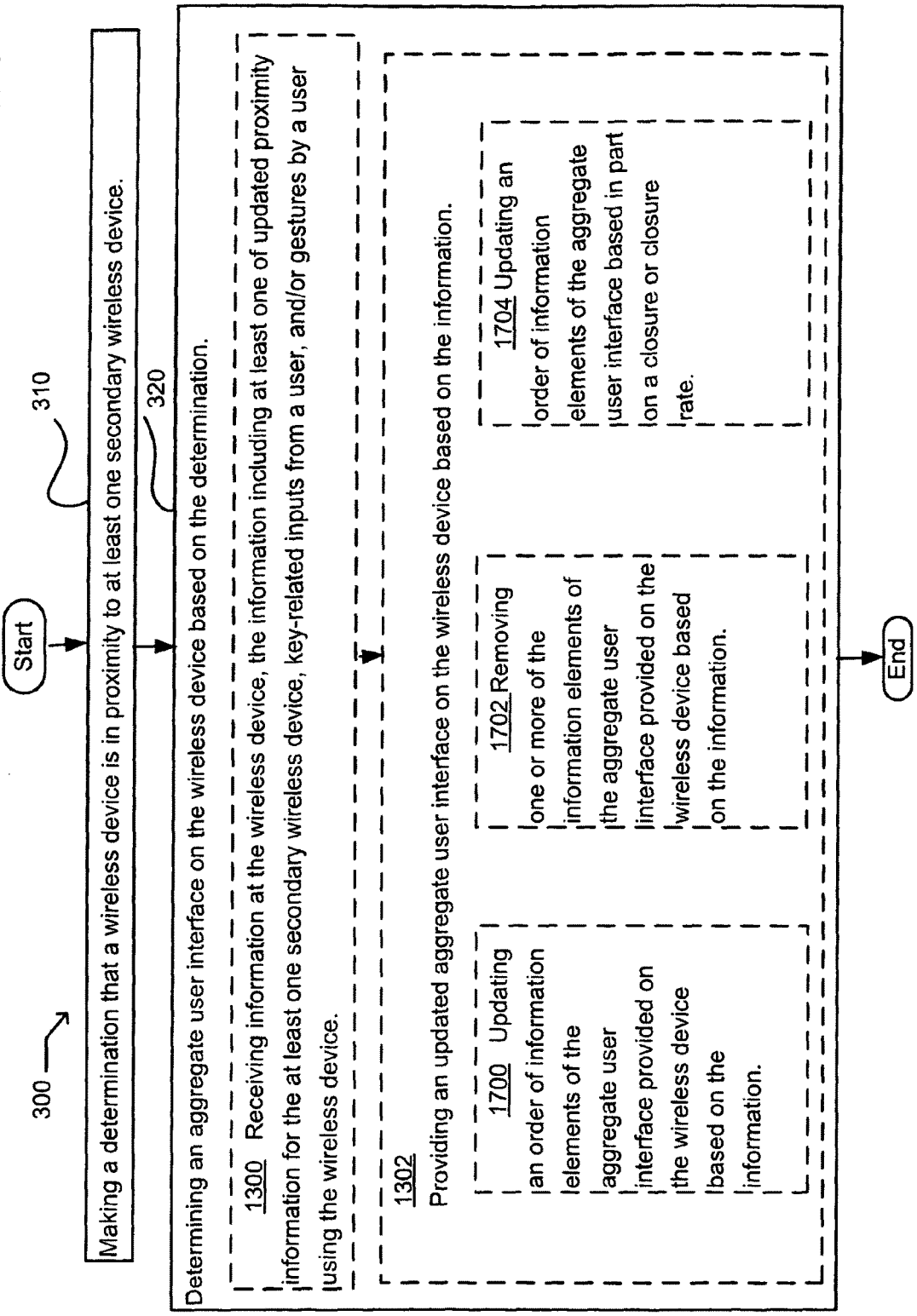
FIG. 17 illustrates an alternative embodiment of the example operational flow of FIG. 3.

FIG. 17 illustrates alternative embodiments of the example operational flow 300 of FIGS. 3 and 13. FIG. 17 illustrates example embodiments where the providing operation 1302 may include at least one additional operation. Additional operations may include an operation 1700, operation 1702, and/or operation 1704.

At the operation 1700 an order of information elements of the aggregate user interface provided on the wireless device is updated based on the information. For example, an order of operations on a menu may be adjusted to provide operations for a closest device at the top, and operations for devices farthest away near the bottom of the menu. At operation 1702 one or more of the information elements of the aggregate user interface provided on the wireless device are removed based on the information. For example, based on a user input or based on updated proximity information for a device, operations for a secondary wireless device may be removed from a menu. At operation 1704 an order of information elements of the aggregate user interface is updated based in part on a closure or closure rate. For example, a listing or menu of available devices or wireless devices in proximity may be updated to list a secondary wireless device at the top of the menu that has a rate of closure (e.g., a rate of decreasing distance or increasing signal strength) that may be greater than other secondary wireless devices in proximity to the wireless device. This may, for example, indicate that the user/wireless device is approaching a specific secondary wireless device (more quickly than other devices), and the operations associated with this specific secondary wireless device may be listed at a top of the menu, highlighted, etc.

Figure 18:
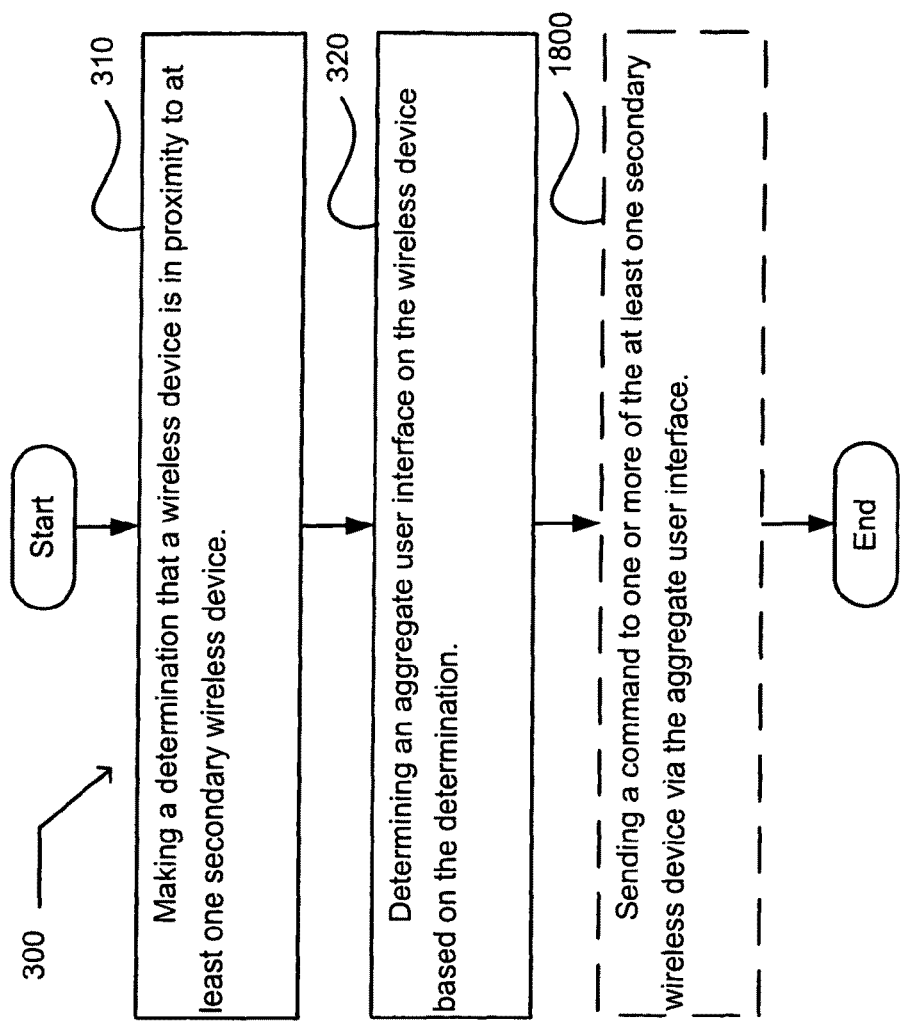
FIG. 18 illustrates an alternative embodiment of the example operational flow of FIG. 3.

FIG. 18 illustrates an alternative embodiment of the example operational flow 300 of FIG. 3. FIG. 18 illustrates an example embodiment where the example operational flow 300 may include at least one additional operation. Additional operations may include an operation 1800. At sending operation 1800, a command is sent to one or more of the at least one secondary wireless device via the aggregate user interface. For example, the command may be sent in response to the aggregate user interface 155 that has been provided to the user 104.

Figure 19:
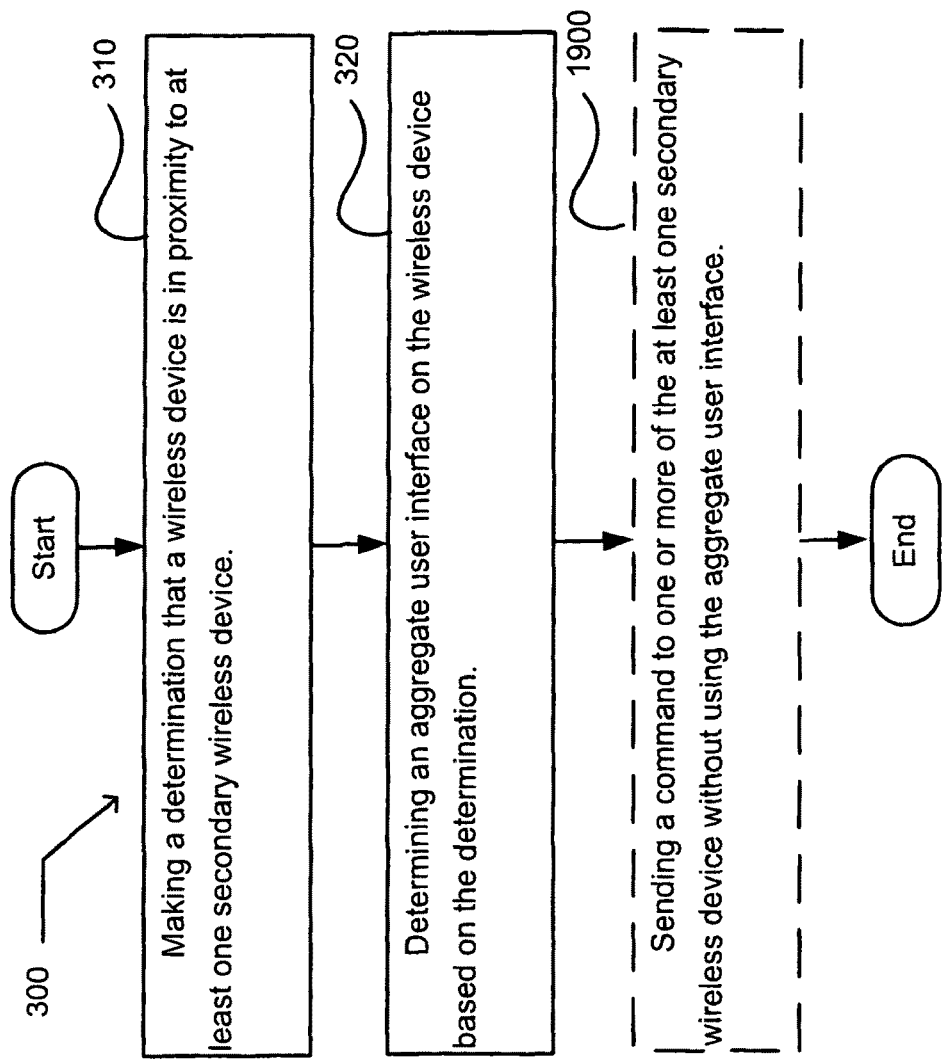
FIG. 19 illustrates an alternative embodiment of the example operational flow of FIG. 3.

FIG. 19 illustrates an alternative embodiment of the example operational flow 300 of FIG. 3. FIG. 19 illustrates an example embodiment where the example operational flow 300 may include at least one additional operation. Additional operations may include an operation 1900. At sending operation 1900, a command is sent to one or more of the at least one secondary wireless devices without using the aggregate user interface. For example, the command may be sent in response to a default operation, a minimal interaction like a gesture, a tilting of the wireless device 100, a re-orientation of the wireless device 100, any event that activates automatic invocation system 198, and the like.

Figure 20:
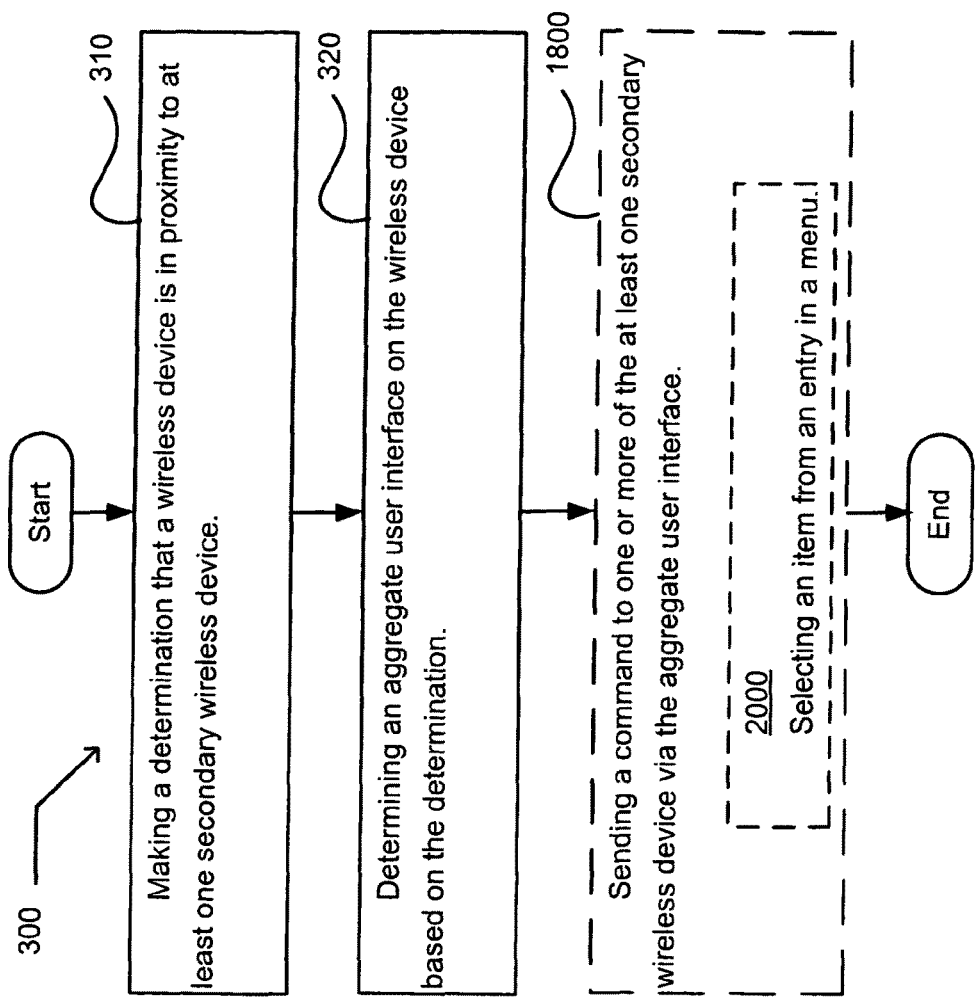
FIG. 20 illustrates an alternative embodiment of the example operational flow of FIG. 3.

FIG. 20 illustrates an alternative embodiment of the example operational flow 300 of FIG. 18. FIG. 20 illustrates an example embodiment where the sending operation 1800 may include at least one additional operation. Additional operations may include an operation 2000.

At selecting operation 2000, an item is selected from an entry in a menu. Therefore, the user may use the aggregate user interface 155 when a menu 156 is provided, for example. Selecting an entry in the menu 156 may comprise, for instance, sending a command to invoke one or more operations on one or more of the secondary wireless devices 101.

Figure 21:
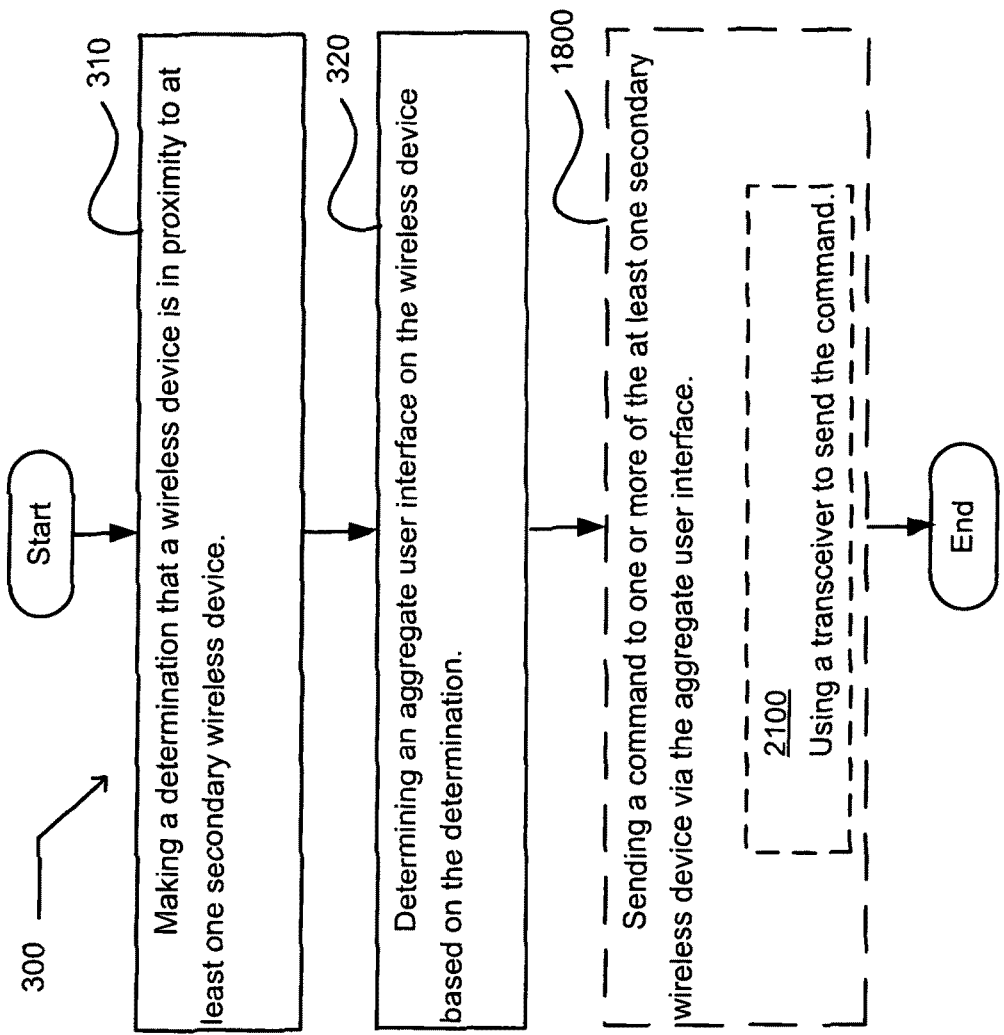
FIG. 21 illustrates an alternative embodiment of the example operational flow of FIG. 3.

FIG. 21 illustrates an alternative embodiment of the example operational flow 300 of FIG. 18. FIG. 21 illustrates an example embodiment where the sending operation 1800 may include at least one additional operation. Additional operations may include an operation 2100.

At the operation 2100 a transceiver is used to send the command. For example, as shown in FIG. 1, wireless device 100 may make a determination that secondary wireless devices 101 are in proximity 106 to wireless device 100 by detecting a touching or contact between the two wireless devices. Alternatively, wireless device 100 may make a determination that it is in proximity 106 or near a secondary wireless device 101 by wirelessly detecting the secondary wireless device 101 and/or establishing a wireless link or connection with the secondary wireless device 101, for example. A transceiver 157 may be used in the wireless device 100 and/or the secondary wireless devices 101 to handle the connection. The command which is transmitted using the transceiver 157 may be, for instance, to invoke one or more operations on the secondary wireless device 101.

Figure 22:
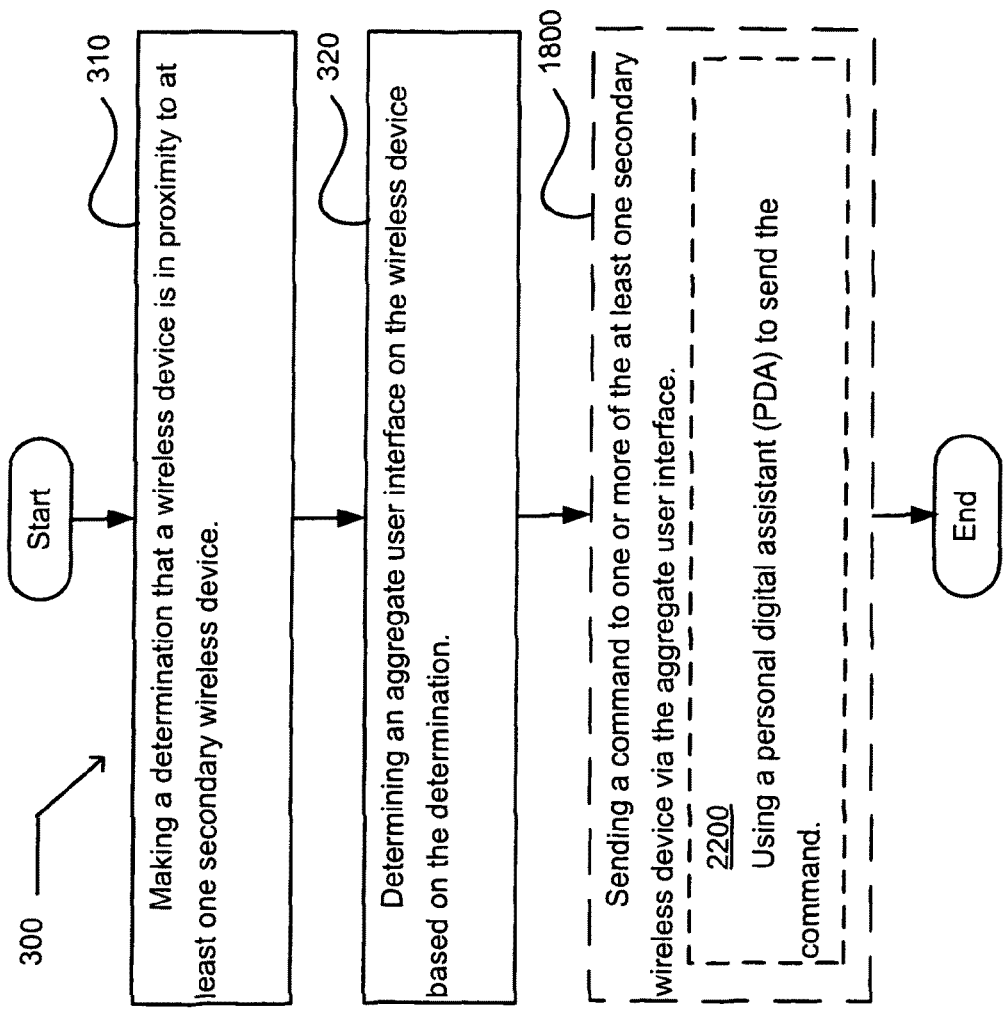
FIG. 22 illustrates an alternative embodiment of the example operational flow of FIG. 3.

FIG. 22 illustrates an alternative embodiment of the example operational flow 300 of FIG. 18. FIG. 22 illustrates an example embodiment where the sending operation 1800 may include at least one additional operation. Additional operations may include an operation 2200.

At the operation 2200 a personal digital assistant (PDA) is used to send the command. For example, the PDA may be not only a controller 160 for the wireless device 100, but it may also be in a state that is used by the system when determining what aggregate user interface 155 should be provided, (i.e., if the user has an open browser application, the user's URL may be used to determine what state the secondary wireless device 101 should enter when it is turned on).

Figure 23:
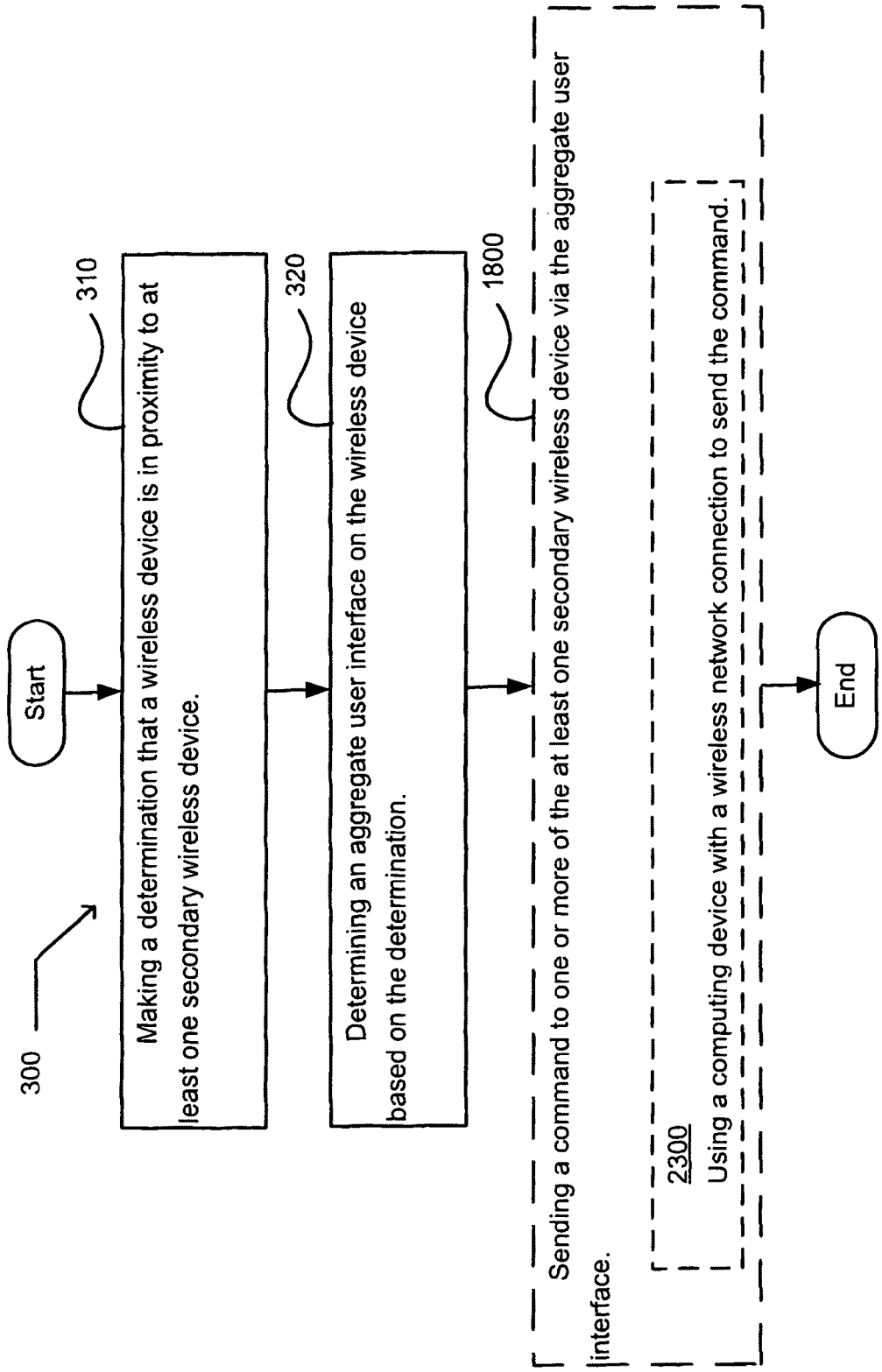
FIG. 23 illustrates an alternative embodiment of the example operational flow of FIG. 3.

FIG. 23 illustrates an alternative embodiment of the example operational flow 300 of FIG. 18. FIG. 23 illustrates an example embodiment where the sending operation 1800 may include at least one additional operation. Additional operations may include an operation 2300.

At the operation 2300 a computing device with a wireless network connection is used to send the command. For example, the computing device may be not only a controller 160 for the wireless device 100, but it may also be in a state that is used by the system when determining what aggregate user interface 155 should be provided, (e.g., if the user has an open "contact" application, the user's contact may be e-mailed an image automatically, if the user 104 connects to a secondary wireless device 101 that has that image displayed).

Figure 24:
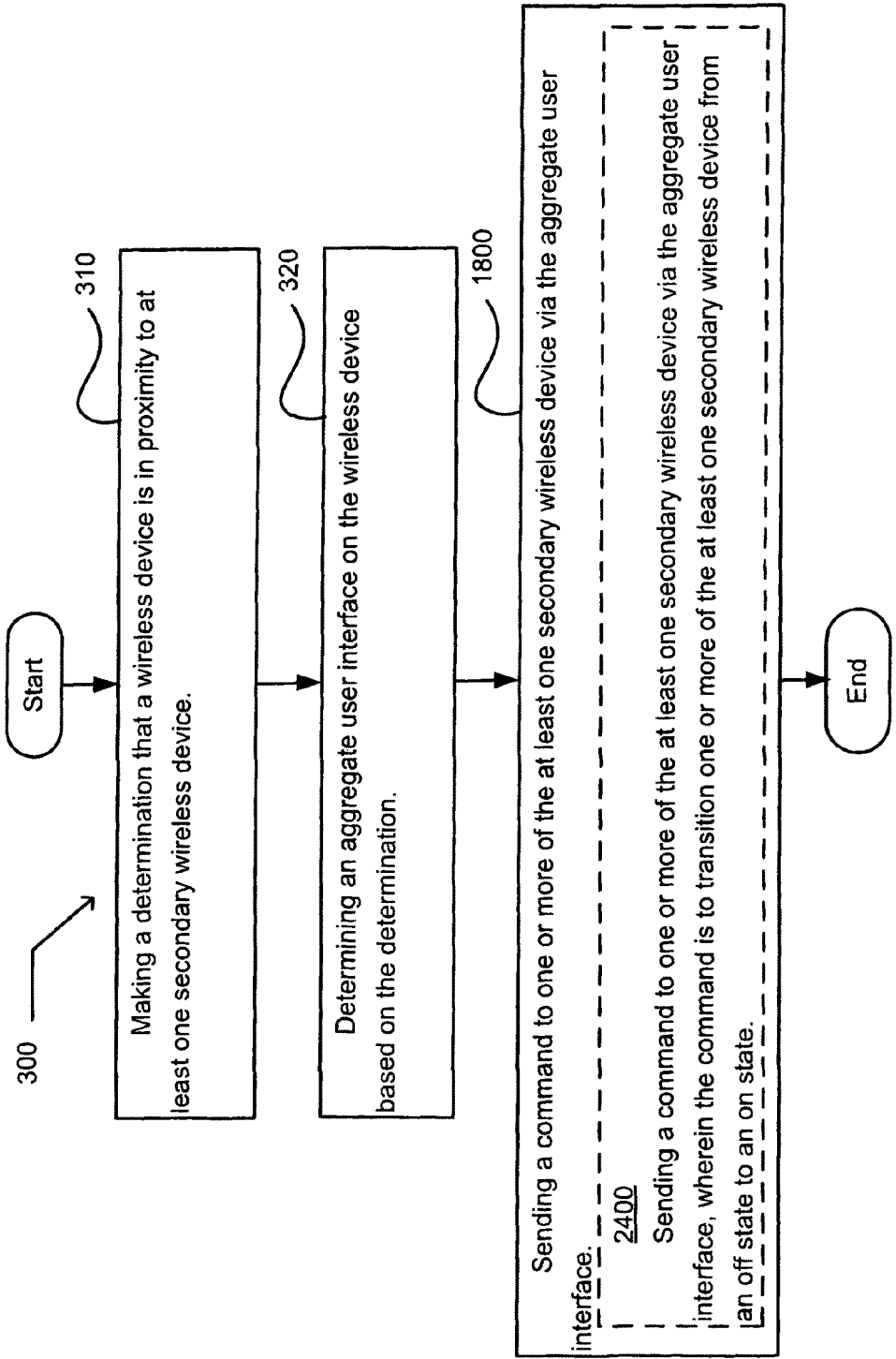
FIG. 24 illustrates an alternative embodiment of the example operational flow of FIG. 3.

FIG. 24 illustrates an alternative embodiment of the example operational flow 300 of FIG. 18. FIG. 24 illustrates an example embodiment where the sending operation 1800 may include at least one additional operation. Additional operations may include an operation 2400.

At the sending operation 2400, a command is sent to one or more of the at least one secondary wireless device via the aggregate user interface, wherein the command is to transition one or more of the at least one secondary wireless device from an off state to an on state. For example, the wireless device 100 may be used to activate (or turn on) a secondary wireless device 101 that is currently turned off, when the user 104 wants to access the device.

Figure 25:
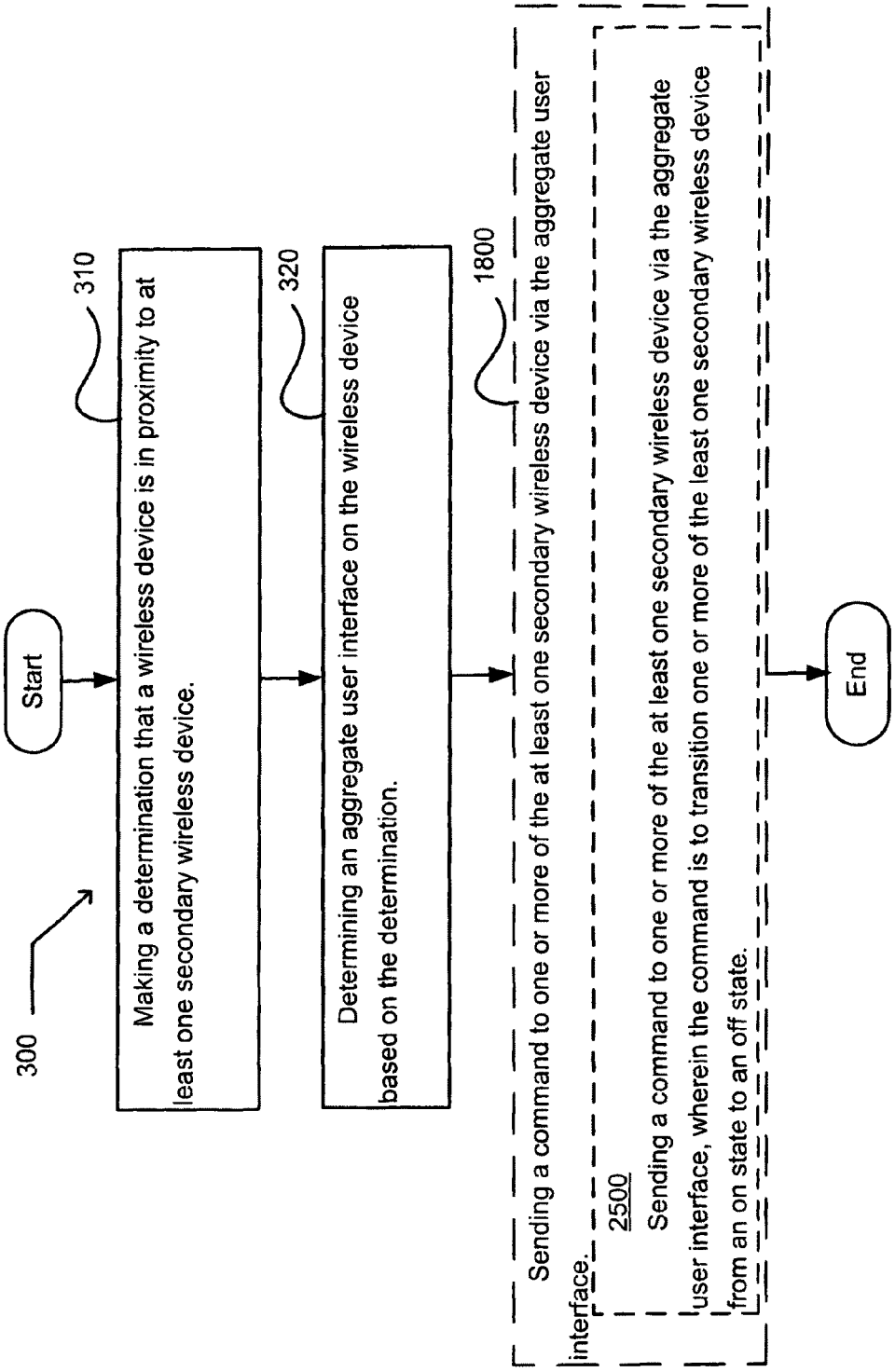
FIG. 25 illustrates an alternative embodiment of the example operational flow of FIG. 3.

FIG. 25 illustrates an alternative embodiment of the example operational flow 300 of FIG. 18. FIG. 25 illustrates an example embodiment where the sending operation 1800 may include at least one additional operation. Additional operations may include an operation 2500.

At the sending operation 2500, a command is sent to one or more of the at least one secondary wireless device via the aggregate user interface, wherein the command is to transition one or more of the least one secondary wireless device from an on state to an off state. For example, the wireless device 100 may be used to de-activate (e.g., turn off) a secondary wireless device 101 that is currently turned on, when the user 104 no longer wants to access the device.

Figure 26:
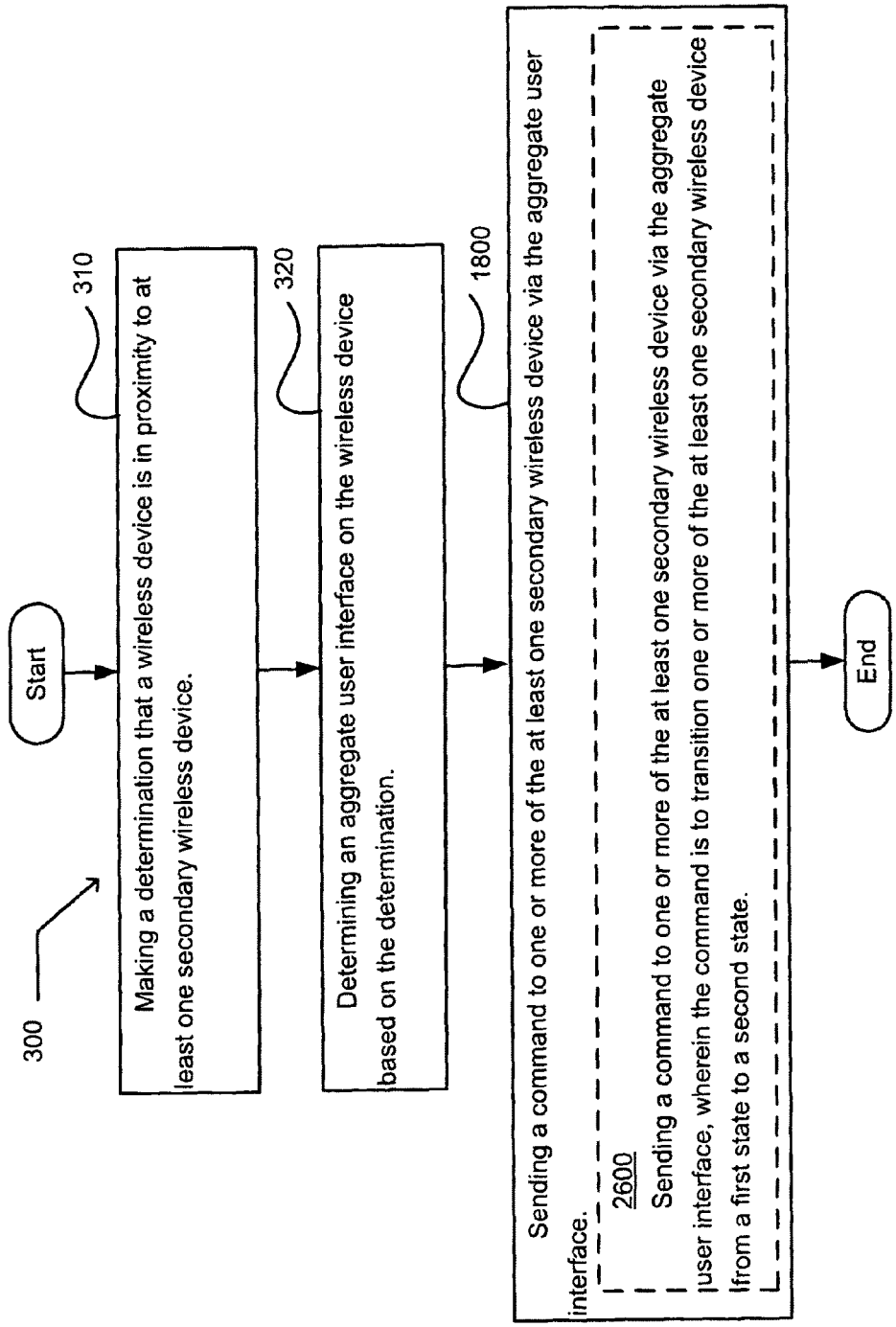
FIG. 26 illustrates an alternative embodiment of the example operational flow of FIG. 3.

FIG. 26 illustrates an alternative embodiment of the example operational flow 300 of FIG. 18. FIG. 26 illustrates an example embodiment where the sending operation 1800 may include at least one additional operation. Additional operations may include an operation 2600.

At the sending operation 2600, a command is sent to one or more of the at least one secondary wireless device via the aggregate user interface, wherein the command is to transition one or more of the at least one secondary wireless device from a first state to a second state. For example, the wireless device 100 may be used to change the state of a secondary wireless device 101 that is currently turned on, when the user 104 wants to interact with the device in a different manner than he is currently interacting with the device.

Figure 27:
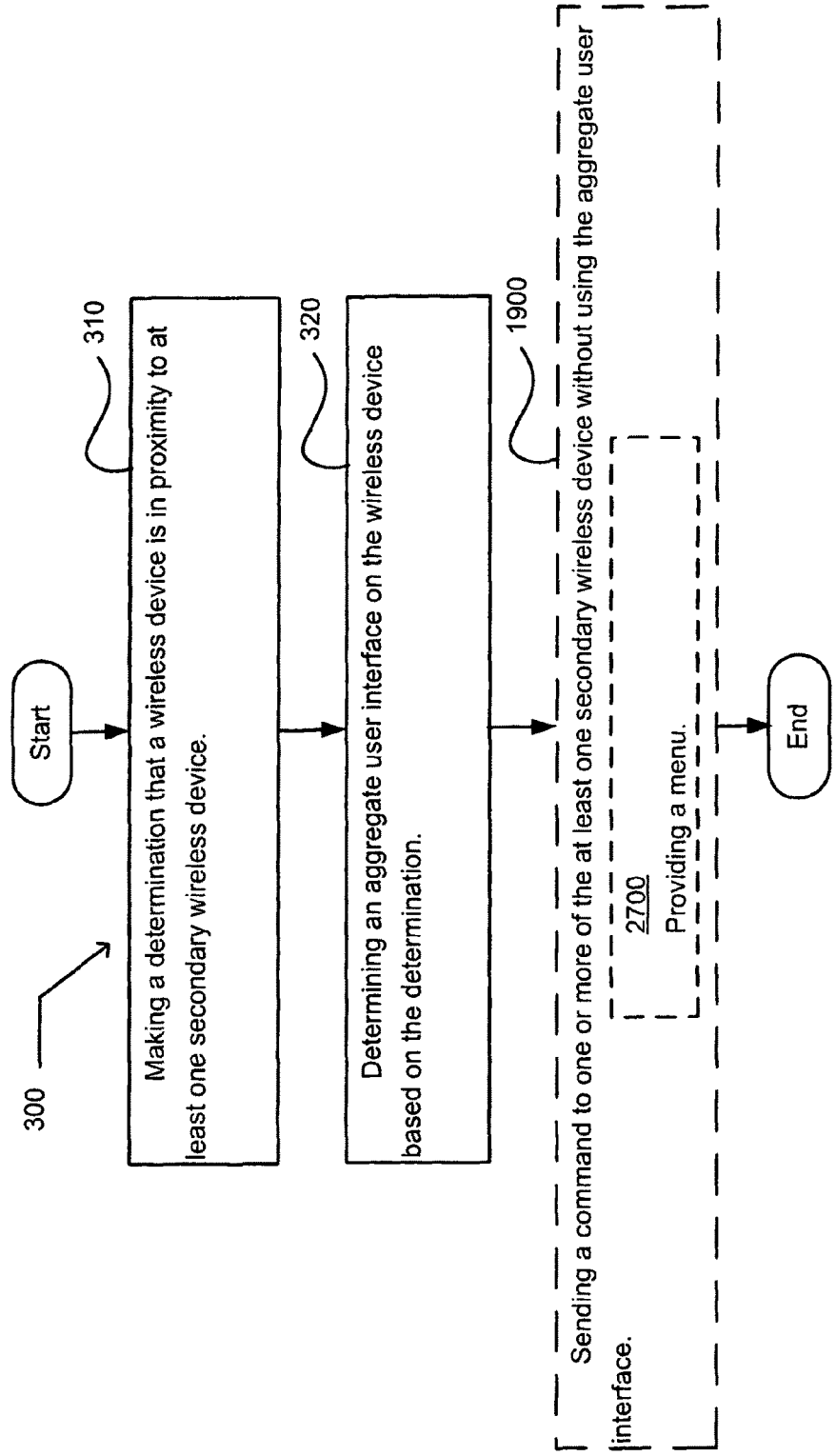
FIG. 27 illustrates an alternative embodiment of the example operational flow of FIG. 3.

FIG. 27 illustrates an alternative embodiment of the example operational flow 300 of FIG. 19. FIG. 27 illustrates an example embodiment where the sending operation 1900 may include at least one additional operation. Additional operations may include an operation 2700.

At the providing operation 2700, a menu is provided. For example, a default operation may be invoked automatically (i.e., turn on a device), then the device may provide the associated menu to the user's wireless device 100.

Figure 28:
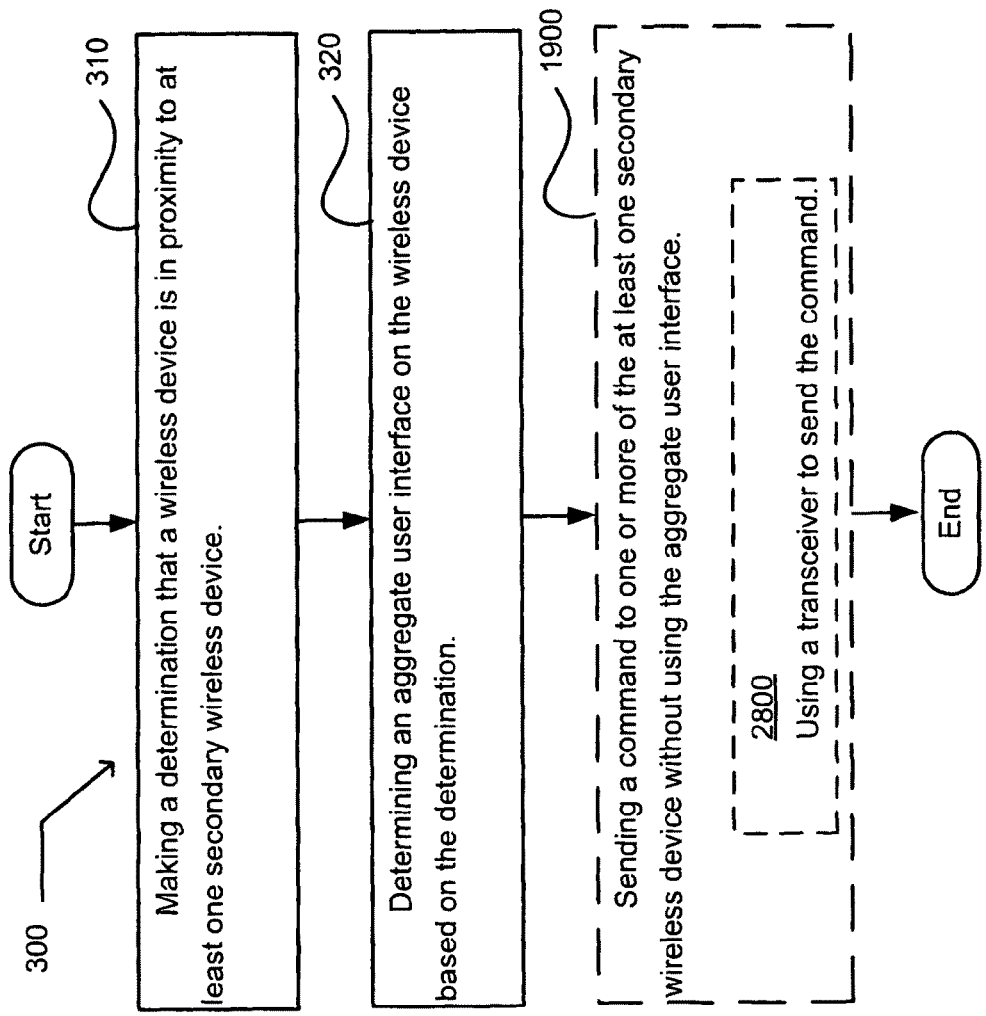
FIG. 28 illustrates an alternative embodiment of the example operational flow of FIG. 3.

FIG. 28 illustrates an alternative embodiment of the example operational flow 300 of FIG. 19. FIG. 28 illustrates an example embodiment where the sending operation 1900 may include at least one additional operation. Additional operations may include an operation 2800.

At the operation 2800 a transceiver is used to send the command. For example, as shown in FIG. 1, transceiver 157 may be used in a wireless device 100 to handle a wireless connection to a plurality of secondary wireless devices 101. The command which is transmitted using the transceiver 157 may be, for instance, to invoke one or more operations on the secondary wireless device 101 either automatically by default, or as non-default actions 199 that the user 104 chooses to invoke.

Figure 29:
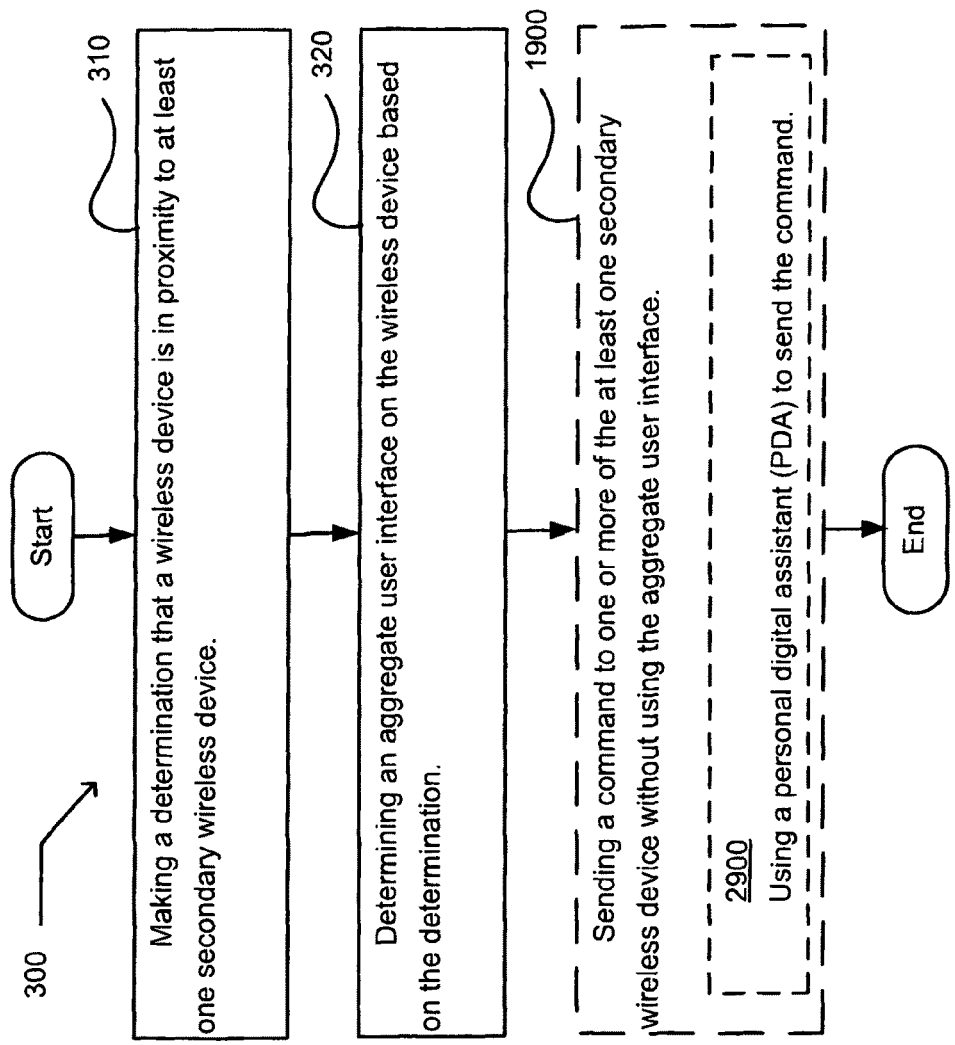
FIG. 29 illustrates an alternative embodiment of the example operational flow of FIG. 3.

FIG. 29 illustrates an alternative embodiment of the example operational flow 300 of FIG. 19. FIG. 29 illustrates an example embodiment where the sending operation 1900 may include at least one additional operation. Additional operations may include an operation 2900.

At the operation 2900, a personal digital assistant (PDA) is used to send the command. The PDA may be configured, for instance, to respond to gesturing, re-orienting, opening and closing, or otherwise repositioning the PDA in a physical manner to determine that the command should be sent, as opposed to such a command being explicitly selected from a menu 156 by the user 104.

Figure 30:
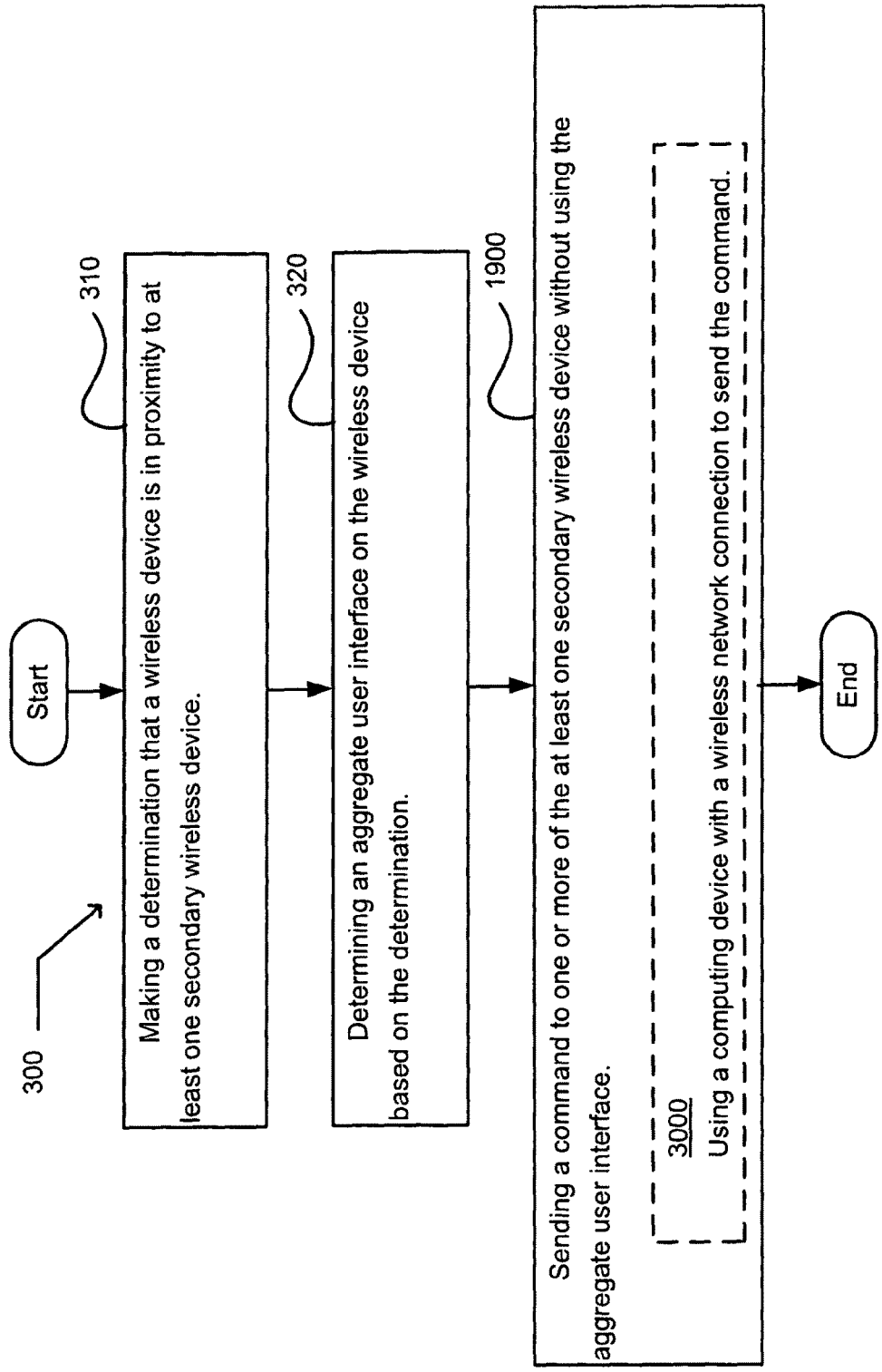
FIG. 30 illustrates an alternative embodiment of the example operational flow of FIG. 3.

FIG. 30 illustrates an alternative embodiment of the example operational flow 300 of FIG. 19. FIG. 30 illustrates an example embodiment where the sending operation 1900 may include at least one additional operation. Additional operations may include an operation 3000.

At the operation 3000, a computing device with a wireless network connection is used to send the command. For example, a handheld computing device, such as a cell phone or PDA, may send a command (e.g., a "record song" command) via a wireless link or wireless network connection to an audio recording device.

Figure 31:
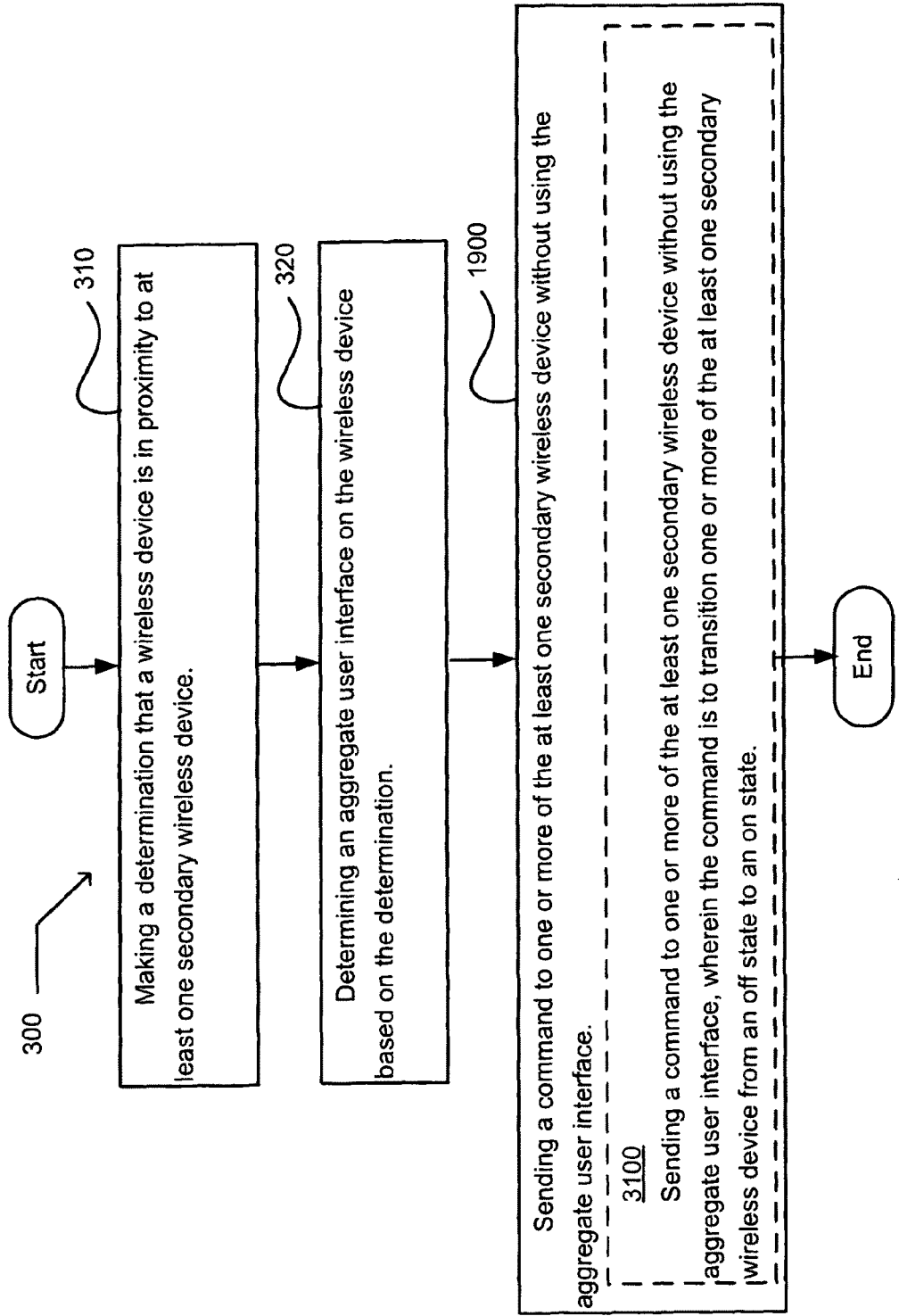
FIG. 31 illustrates an alternative embodiment of the example operational flow of FIG. 3.

FIG. 31 illustrates an alternative embodiment of the example operational flow 300 of FIG. 19. FIG. 31 illustrates an example embodiment where the sending operation 1900 may include at least one additional operation. Additional operations may include an operation 3100.

At sending operation 3100, a command is sent to one or more of the at least one secondary wireless device without using the aggregate user interface, wherein the command is to transition one or more of the at least one secondary wireless device from an off state to an on state. For example, the wireless device 100 may be used to activate a secondary wireless device 101 that is currently turned off, when the user 104 wants to access the device. The aggregate user interface 155 may be bypassed in instances where the wireless device 100 is instructed by the user 104 to perform such an action by default, the environment or use habits indicate that this is the default state, or by some other technique.

Figure 32:
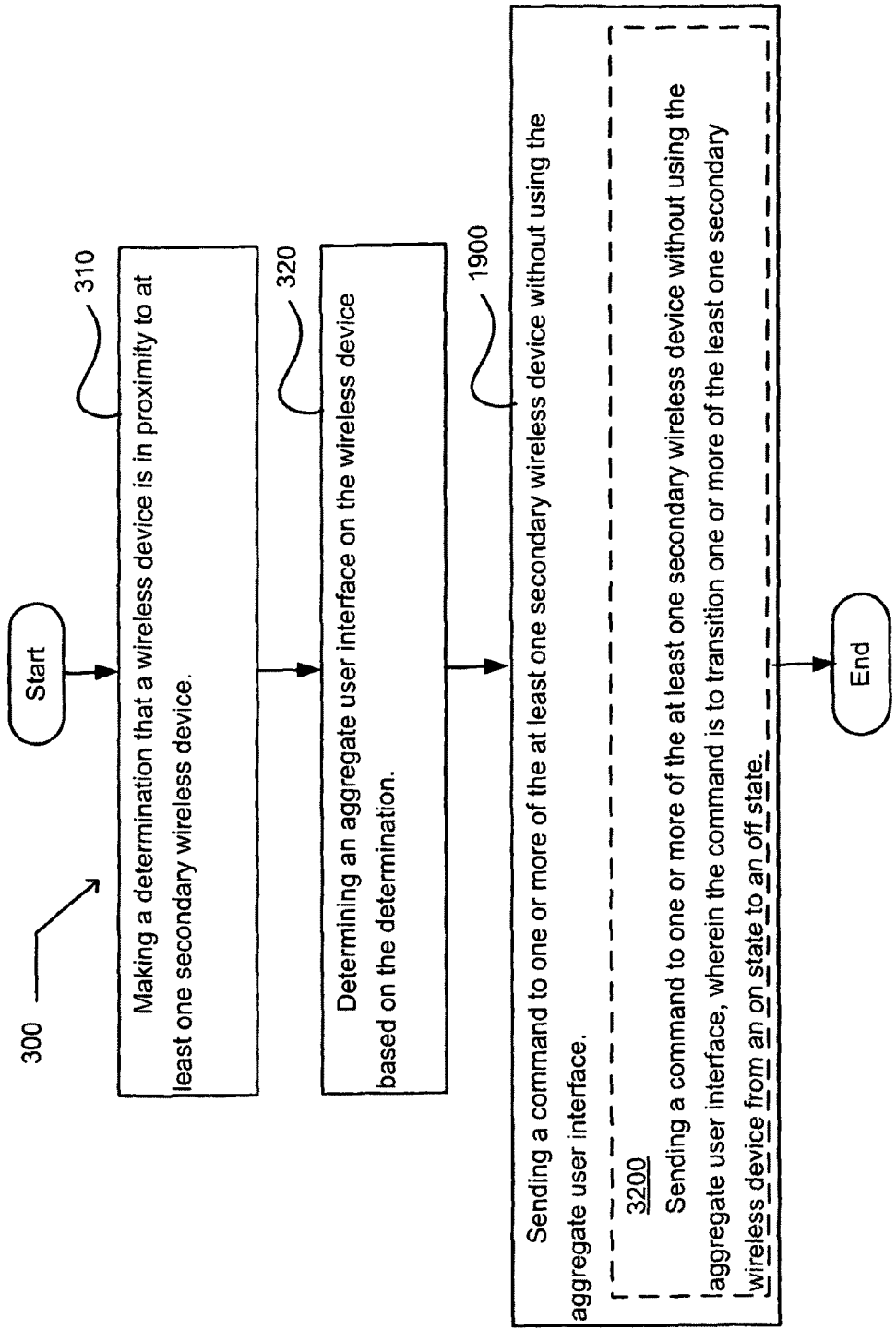
FIG. 32 illustrates an alternative embodiment of the example operational flow of FIG. 3.

FIG. 32 illustrates an alternative embodiment of the example operational flow 300 of FIG. 19. FIG. 32 illustrates an example embodiment where the sending operation 1900 may include at least one additional operation. Additional operations may include an operation 3200.

At sending operation 3200, a command is sent to one or more of the at least one secondary wireless device without using the aggregate user interface, wherein the command is to transition one or more of the at least one secondary wireless device from an on state to an off state. For example, the wireless device 100 may be used to de-activate a secondary wireless device 101 that is currently turned on, when the user no longer wants to access the device.

Figure 33:
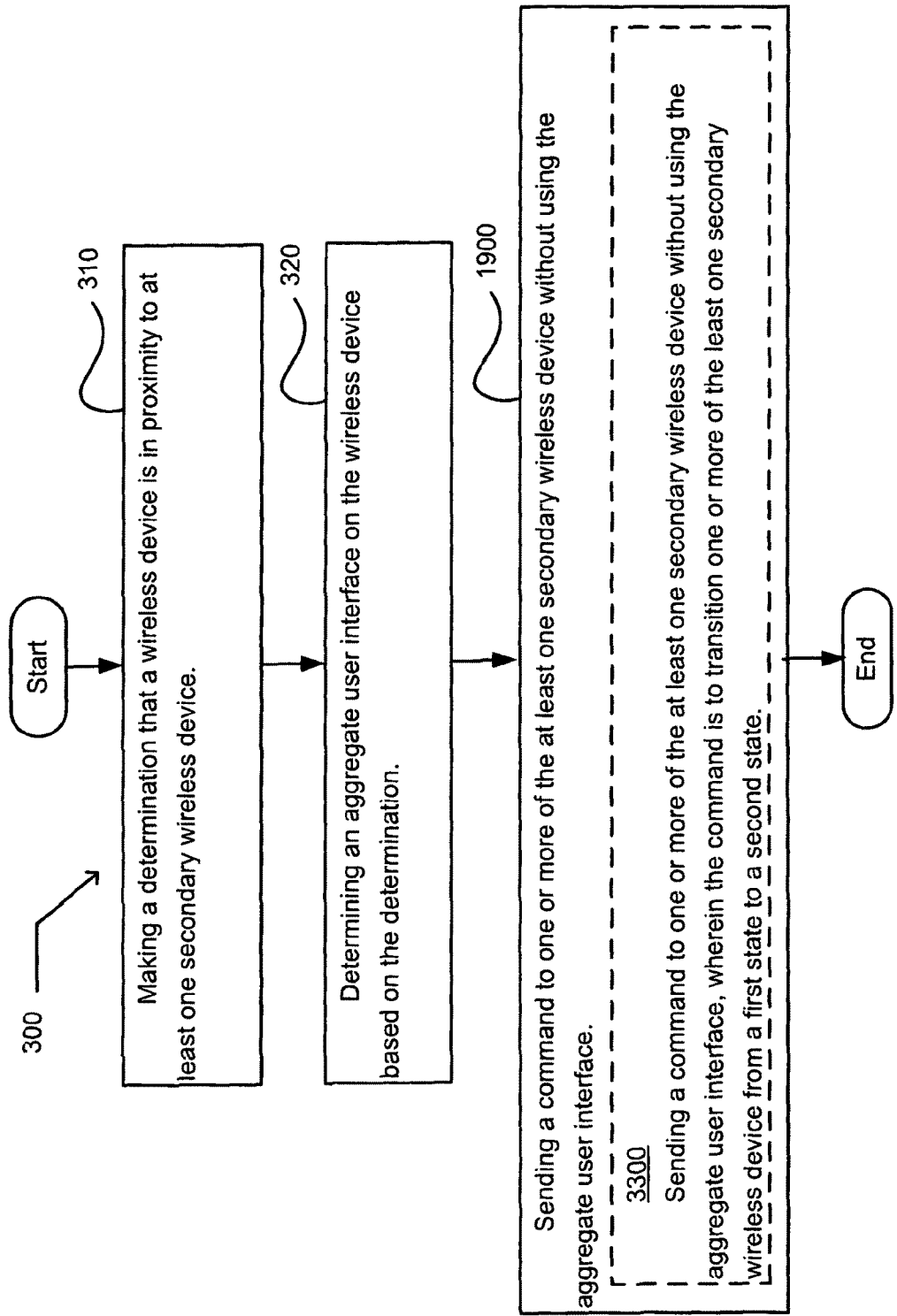
FIG. 33 illustrates an alternative embodiment of the example operational flow of FIG. 3.

FIG. 33 illustrates an alternative embodiment of the example operational flow 300 of FIG. 19. FIG. 33 illustrates an example embodiment where the sending operation 1900 may include at least one additional operation. Additional operations may include an operation 3300.

At sending operation 3300, a command is sent to one or more of the at least one secondary wireless device without using the aggregate user interface, wherein the command is to transition one or more of the at least one secondary wireless device from a first state to a second state. For example, the wireless device 100 may be used to change the state of a secondary wireless device 101 that is currently turned on, when the user 104 wants to interact with the device in a different manner than he is currently interacting with the device.

Figure 34:
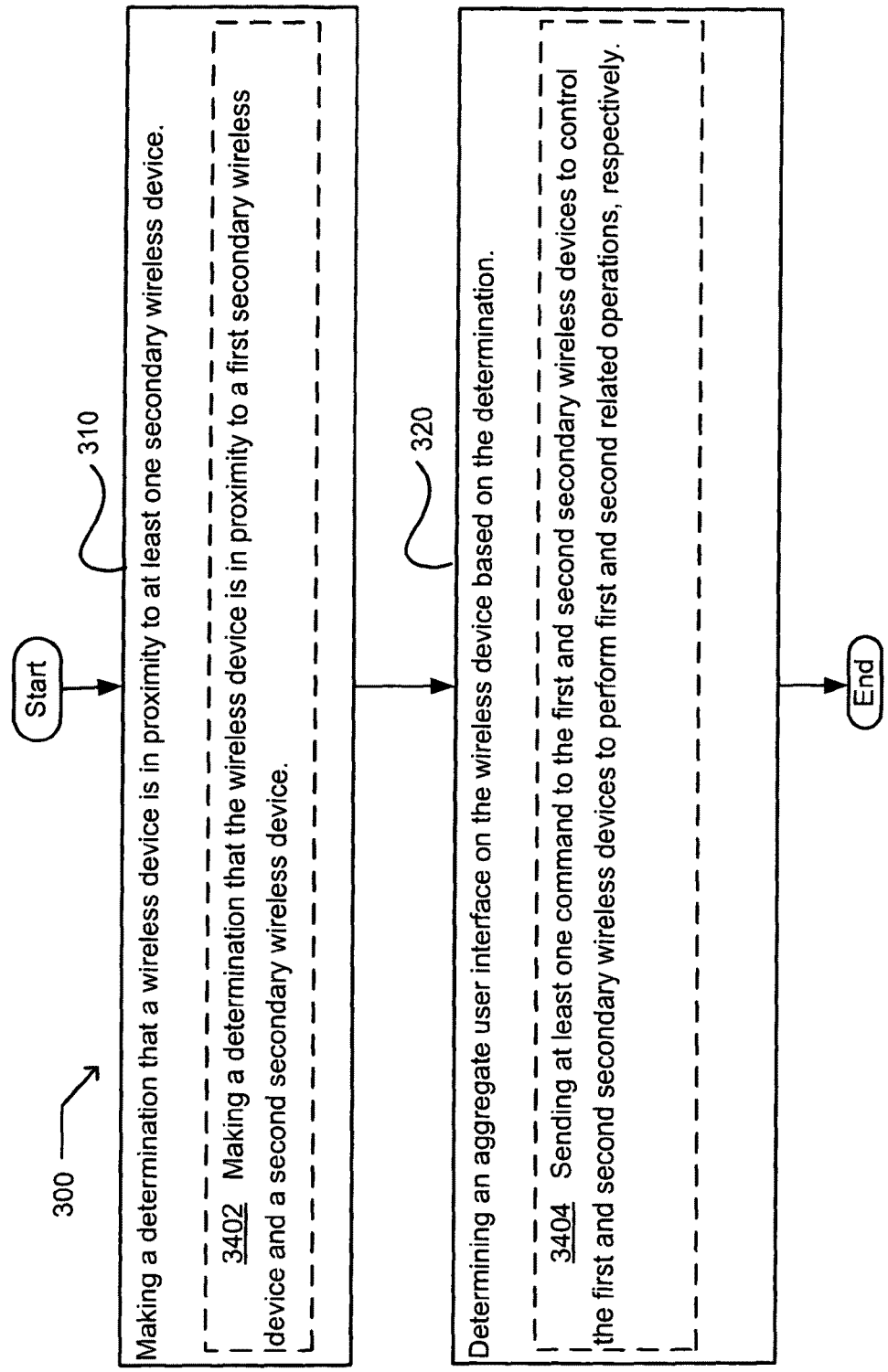
FIG. 34 illustrates an alternative embodiment of the example operational flow of FIG. 3.

FIG. 34 illustrates alternative embodiments of the example operational flow of FIG. 3. FIG. 34 illustrates example embodiments where the making operation 310 may include at least one additional operation, and/or where the determining operation 320 may include at least one additional operation. Additional operations may include operations 3402 and 3404.

At making operation 3402, a determination is made that the wireless device is in proximity to a first secondary wireless device and a second secondary wireless device. For example, wireless device 100 may make a determination that it is in proximity to a television and to a DVD recorder.

At sending operation 3404, at least one command is sent to the first and second secondary wireless devices to control the first and second secondary wireless devices to perform first and second related operations, respectively. For example, a "record TV program" command may be sent to the television and the DVD recorder to control the television to tune to a television program and to control the DVD recorder to begin recording the program. The "record TV program" may be one command or multiple commands. In an example embodiment, the operation of the television tuning to a specific TV program and the DVD recorder recording the program may be considered to be related operations, e.g., since these operations may be used or performed together to accomplish a requested task or function. Alternatively, wireless device 100 may send a first command ("record TV program") to the television, and where the television may separately communicate with a DVD recorder (which may or may not be in proximity to the wireless devise 100) to arrange for the TV program to be recorded.

Figure 35:
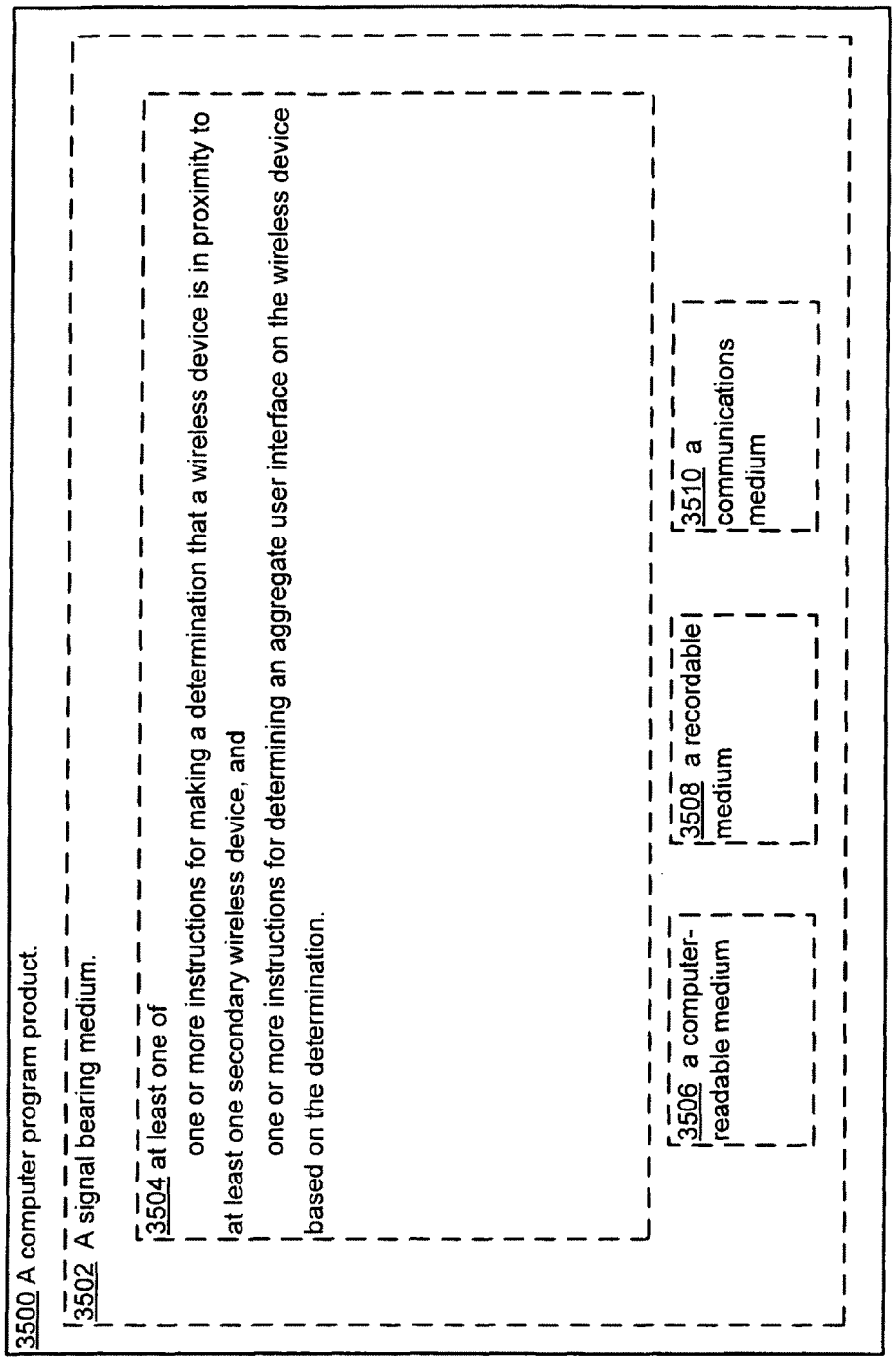
FIG. 35 illustrates a partial view of an example computer program product that includes a computer program for executing a computer process on a computing device.

FIG. 35 illustrates a partial view of an example computer program product 3500 that includes a computer program 3504 for executing a computer process on a computing device. An embodiment of the example computer program product 3500 is provided using a signal bearing medium 3502, and may include at least one of one or more instructions for making a determination that a wireless device is in proximity to at least one secondary wireless device, the signal bearing medium also bearing one or more instructions for determining an aggregate user interface on the wireless device based on the determination. The one or more instructions may be, for example, computer executable and/or logic-implemented instructions. In one implementation, the signal-bearing medium 3502 may include a computer-readable medium 3506. In one implementation, the signal bearing medium 3502 may include a recordable medium 3508. In one implementation, the signal bearing medium 3502 may include a communications medium 3510.

Figure 36:
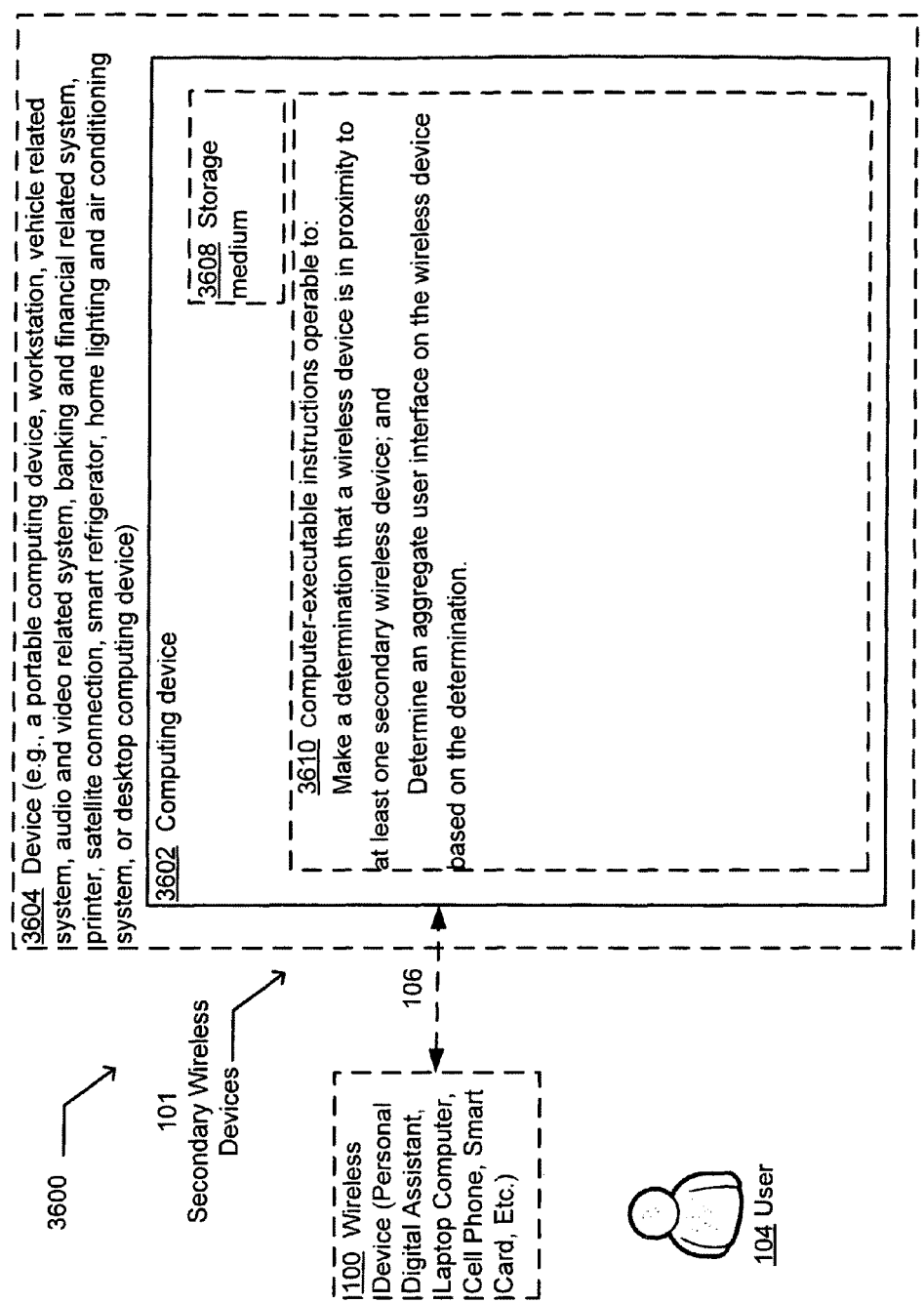
FIG. 36 illustrates an example system in which embodiments may be implemented.

FIG. 36 illustrates an example system 3600 in which embodiments may be implemented. The system 3600 includes a computing system environment at wireless device 100 and secondary wireless devices 101. The system 3600 also illustrates the user 104 using the wireless device 100, which is optionally shown as being in communication with the secondary wireless devices 101 by way of a proximity based connection 106. The proximity 106 may represent a local, wide-area, or peer-to-peer network, or may represent a bus that is internal to a computing device (e.g., in example embodiments in which the computing device 3602 is contained in whole or in part within the device 3604). A storage medium 3608 may be any computer storage media.

The wireless device 100 and secondary wireless devices 101 use computer-executable instructions 3610 that when executed on the wireless device 100 and/or the secondary wireless devices 101 cause the computing devices to make a determination that a wireless device is in proximity to at least one secondary wireless device, and determine an aggregate user interface on the wireless device based on the determination.

In FIG. 36, then, the system 3600 includes at least one computing device (e.g., 3602 and/or 3604). The computer-executable instructions 3610 may be executed on one or more of the at least one computing device. For example, the computing device 3602 may implement the computer-executable instructions 3610 and output a result to (and/or receive data from) the computing device 3604. Since the computing device 3602 may be wholly or partially contained within the computing device 3604, the computing device 3604 also may be said to execute some or all of the computer-executable instructions 3610, in order to be caused to perform or implement, for example, various ones of the techniques described herein, or other techniques.

The wireless device 100 may include, for example, one or more of a personal digital assistant (PDA), a laptop computer, a tablet personal computer, a networked computer, a computing system comprised of a cluster of processors, a workstation computer, a cellular phone, a smartcard, a remote control, and/or a desktop computer. In another example embodiment, the wireless device 100 may be operable to communicate with the secondary wireless devices 101 to communicate with a database (e.g., implemented using the storage medium 3608) to access the at least one dataset and/or to access the second dataset.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, a RAM, a flash memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the embodiments of the invention.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method comprising:
    making a determination that a wireless device is in proximity to at least one secondary wireless device;
    determining an aggregate user interface on the wireless device based on the determination; and
    sending a command to one or more of the at least one secondary wireless device via the aggregate user interface, wherein sending a command to one or more of the at least one secondary wireless device via the aggregate user interface further comprises:

sending a command to one or more of the at least one secondary wireless device via the aggregate user interface, wherein command is to transition one or more of the at least one secondary wireless device from a first state to a second state.

2. A method comprising:

making a determination that a wireless device is in proximity to at least one secondary wireless device;

determining an aggregate user interface on the wireless device based on the determination; and sending a command to one or more of the at least one secondary wireless device without using the aggregate user interface.

3. The method of claim 2 wherein sending a command to one or more of the at least one secondary wireless device without using the aggregate user interface further comprises: providing a menu.

4. The method of claim 2 wherein sending a command to one or more of the at least one secondary wireless device without using the aggregate user interface further comprises: using a transceiver to send the command.

5. The method of claim 2 wherein sending a command to one or more of the at least one secondary wireless device without using the aggregate user interface further comprises: using a personal digital assistant (PDA) to send the command.

6. The method of claim 2 wherein sending a command to one or more of the at least one secondary wireless device without using the aggregate user interface further comprises: using a computing device with a wireless network connection to send the command.

7. The method of claim 2 wherein sending a command to one or more of the at least one secondary wireless device without using the aggregate user interface further comprises:

sending a command to one or more of the at least one secondary wireless device without using the aggregate user interface, wherein command is to transition one or more of the least one secondary wireless device from an off state to an on state.

8. The method of claim 2 wherein sending a command to one or more of the at least one secondary wireless device without using the aggregate user interface further comprises:

sending a command to one or more of the at least one secondary wireless device without using the aggregate user interface, wherein command is to transition one or more of the least one secondary wireless device from an on state to an off state.

9. The method of claim 2 wherein sending a command to one or more of the at least one secondary wireless device without using the aggregate user interface further comprises:

sending a command to one or more of the at least one secondary wireless device without using the aggregate user interface, wherein command is to transition one or more of the least one secondary wireless device from a first state to a second state.

10. The method of claim 2 wherein sending a command to one or more of the at least one secondary wireless device without using the aggregate user interface further comprises:

sending a command to one or more of the at least one secondary wireless device without using the aggregate user interface, wherein command is to transition one or more of the least one secondary wireless device from a first state to a second state.

11. The method of claim 10 wherein the determining an aggregate user interface on the wireless device based on the determination comprises:

sending at least one command to the first and second secondary wireless devices to control the first and second secondary wireless devices to perform first and second related operations, respectively.

12. The method of claim 1 wherein making a determination that a wireless device is in proximity to at least one secondary wireless device comprises:

making a determination that the wireless device is in proximity to one or more of a plurality of secondary wireless devices.

13. The method of claim 1 wherein determining an aggregate user interface on the first wireless device based on the determination comprises:

providing an available interaction with one or more operations related to the at least one secondary wireless device based on the determination.

14. The method of claim 1 wherein determining an aggregate user interface on the first wireless device based on the determination comprises:

providing a menu of operations on the wireless device including at least one operation for one or more of the at least one secondary wireless device based on the determination.

15. A method comprising:

making a determination that a wireless device is in proximity to at least one secondary wireless device; and determining an aggregate user interface on the wireless device based on the determination, wherein determining an aggregate user interface on the wireless device based on the determination comprises:

identifying one or more of the at least one secondary wireless device;

identifying a function for one or more of the at least one secondary wireless device;

identifying a property, attribute, sub-component, or element for one or more of the at least one secondary wireless device;

identifying a relative location for one or more of the at least one secondary wireless device;

identifying an ownership of one or more of the at least one secondary wireless device; and/or identifying any access restrictions of one or more of the at least one secondary wireless device.

16. A method comprising making a determination that a wireless device is in proximity to at least one secondary wireless device; and determining an aggregate user interface on the wireless device based on the determination, wherein determining an aggregate user interface on the wireless device based on the determination comprises:

providing an aggregate user interface on the wireless device based on a function of one or more of the at least one secondary wireless device;

providing an aggregate user interface on the wireless device based on a capability of one or more of the at least one secondary wireless device;

providing an aggregate user interface on the wireless device based on a location of one or more of the at least one secondary wireless device;

providing an aggregate user interface on the wireless device based on an ownership of one or more of the at least one secondary wireless device;

providing an aggregate user interface on the wireless device based on any access restrictions of one or more of the at least one secondary wireless device;

providing an aggregate user interface on the wireless device based on a history of use of one or more of the at least one secondary wireless device;

providing an aggregate user interface on the wireless device based on a user configuration with respect to one or more of the at least one secondary wireless device; and/or providing an aggregate user interface on the wireless device based on a closure rate with respect to one or more of the at least one secondary wireless device.

17. The method of claim 1 wherein determining an aggregate user interface on the wireless device based on the determination comprises:

receiving information at the wireless device indicating at least one function of one or more of the at least one secondary wireless device; and providing an aggregate user interface on the wireless device indicating the at least one function of one or more of the at least one secondary wireless device based on the information.

18. The method of claim 1 wherein determining an aggregate user interface on the wireless device based on the determination comprises:

determining a state or property of an application on the wireless device; and providing an aggregate user interface on the wireless device based on the determination and based on the determining a state or property of an application on the wireless device.

19. A method comprising:

making a determination that a wireless device is in proximity to at least one secondary wireless device; and determining an aggregate user interface on the wireless device based on the determination, wherein determining an aggregate user interface on the wireless device based on the determination comprises:

determining that a first secondary wireless device is closest to the wireless device; and providing an aggregate user interface on the wireless device including an available interaction with one or more operations related to the first secondary wireless device.

20. The method of claim 19 wherein determining an aggregate user interface on the wireless device based on the determination further comprises:

determining that a second secondary wireless device is currently closest to the wireless device; and providing an updated aggregate user interface on the wireless device including an available interaction with one or more operations related to the second secondary wireless device.

21. A method comprising:

making a determination that a wireless device is in proximity to at least one secondary wireless device;

determining an aggregate user interface on the wireless device based on the determination;

receiving information at the wireless device, the information including at least one of updated proximity information for the at least one secondary wireless device, key-related inputs from a user, and gestures by a user using the wireless device; and providing an updated aggregated user interface on the wireless device based on the information.

22. The method of claim 21 wherein receiving information at the wireless device comprises:

receiving information at the wireless device, the information including at least one of updated proximity information for the at least one secondary wireless device, and gestures by a user using the wireless device, the gestures by a user including at least one of moving the wireless device, tilting the wireless device, reorienting the wireless device with respect to the at least one secondary wireless device, moving the wireless device towards the at least one secondary wireless device, moving the wireless device away from the at least one secondary wireless device, pointing a portion of the wireless device at the at least one secondary wireless device, or touching the wireless device to the at least one secondary wireless device.

23. The method of claim 21 wherein providing an updated aggregate user interface on the wireless device based on the information comprises:

updating an order of information elements of the aggregate user interface provided on the wireless device based on the information;

removing one or more of the information elements of the aggregate user interface provided on the wireless device based on the information; and/or updating an order of information elements of the aggregate user interface based in part on a closure or closure rate.

24. A method comprising:

making a determination that a wireless device is in proximity to at least one secondary wireless device; and determining an aggregate user interface on the wireless device based on the determination, wherein determining an aggregate user interface on the wireless device based on the determination comprises:

determining a location for one or more of the at least one secondary wireless device;

determining one or more operations available on one or more of the at least one secondary wireless device;

sorting the one or more operations available, based at least in part on the location; and providing an aggregate user interface on the wireless device based at least in part on the sorting the one or more operations available, based at least in part on the location.

25. A method comprising:

making a determination that a wireless device is in proximity to at least one secondary wireless device; and determining an aggregate user interface on the wireless device based on the determination;

wherein determining an aggregate user interface on the wireless device based on the determination comprises:

determining one or more default operations available on one or more of the at least one secondary wireless device;

determining one or more non-default operations available on one or more of the at least one secondary wireless device;

providing an aggregate user interface on the wireless device based at least in part on the determining one or more default operations available on one or more of the at least one secondary wireless device and the determining one or more non-default operations available on one or more of the at least one secondary wireless device; and invoking substantially automatically at least one of the one or more default operations if no action occurs.

26. A method comprising:

making a determination that a wireless device is in proximity to at least one secondary wireless device;

determining an aggregate user interface on the wireless device based on the determination; and sending a command to one or more of the at least one secondary wireless device via the aggregate user interface, wherein sending a command to one or more of the at least one secondary wireless device via the aggregate user interface further comprises:

selecting an entry in a menu.

27. A method comprising:

making a determination that a wireless device is in proximity to at least one secondary wireless device;

determining an aggregate user interface on the wireless device based on the determination; and sending a command to one or more of the at least one secondary wireless device via the aggregate user interface, wherein sending a command to one or more of the at least one secondary wireless device via the aggregate user interface further comprises:

sending a command to one or more of the at least one secondary wireless device via the aggregate user interface, wherein the command is to transition one or more of the least one secondary wireless device from an off state to an on state.

28. A method comprising:

making a determination that a wireless device is in proximity to at least one secondary wireless device;

determining an aggregate user interface on the wireless device based on the determination; and sending a command to one or more of the at least one secondary wireless device via the aggregate user interface, wherein sending a command to one or more of the at least one secondary wireless device via the aggregate user interface further comprises:

sending a command to one or more of the at least one secondary wireless device via the aggregate user interface, wherein the command is to transition one or more of the least one secondary wireless device from an on state to an off state.

* * * * *